(12) United States Patent
Kanai

(10) Patent No.: US 10,956,105 B2
(45) Date of Patent: Mar. 23, 2021

(54) PRINTING APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Yasunori Kanai, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/587,590

(22) Filed: Sep. 30, 2019

(65) Prior Publication Data

US 2020/0110564 A1    Apr. 9, 2020

(30) Foreign Application Priority Data

Oct. 4, 2018  (JP) .............................. JP2018-189445

(51) Int. Cl.
  *G06F 15/00* (2006.01)
  *G06F 3/12* (2006.01)
  *G06K 1/00* (2006.01)

(52) U.S. Cl.
  CPC .......... *G06F 3/1255* (2013.01); *G06F 3/1207* (2013.01); *G06F 3/1256* (2013.01); *G06F 3/1287* (2013.01)

(58) Field of Classification Search
  CPC .... G06F 3/1255; G06F 3/1207; G06F 3/1256; G06F 3/1287
  USPC ............................... 358/1.15, 1.14, 1.13, 1.1
  See application file for complete search history.

(56) References Cited

U.S. PATENT DOCUMENTS

| 8,958,106 B2 | 2/2015 | Ishihara |
| 9,092,704 B2 | 7/2015 | Yoshida |
| 2006/0082802 A1 | 4/2006 | Furuya |
| 2017/0017447 A1* | 1/2017 | Saigusa ................ G06F 3/1285 |
| 2017/0160997 A1 | 6/2017 | Morita |

(Continued)

FOREIGN PATENT DOCUMENTS

| JP | 2013168758 A | 8/2013 |
| JP | 2014178764 A | 9/2014 |

OTHER PUBLICATIONS

Extended European Search Report issued in European Application No. 19198366.7 dated Mar. 4, 2020.

(Continued)

*Primary Examiner* — Douglas Q Tran
(74) *Attorney, Agent, or Firm* — Rossi, Kimms & McDowell LLP

(57) ABSTRACT

A printing apparatus of the present invention comprises a memory device that stores a set of instructions; and at least one processor that executes the set of instructions to: notify an information processing apparatus of information indicating a combination of print settings that conflict with each other, receive print settings set in the information processing apparatus while avoiding the combination indicated by the information, determine whether the received print settings include settings that conflict with each other, based on information which is different from the notified information and indicates another combination of print settings that conflict with each other, and notify the information processing apparatus of a result of the determination.

14 Claims, 29 Drawing Sheets

(56) References Cited

U.S. PATENT DOCUMENTS

2020/0089440 A1* 3/2020 Takeo .................. G06F 3/1255
2020/0125301 A1* 4/2020 Kaneda ................ G06F 3/1226

OTHER PUBLICATIONS

Sweet et al. "Internet Printing Protocol/1.1: Model and Semantics. RFC8011. 4.2.3 Validate-Job Operation, 4.2.5 Get-Printer-Attributes Operation, 5.4.15 operations-supported." Jan. 2017: 59-64, 157-159.
The Printer Working Group. "PWG 5100.13. IPP: Job and Printer Extensions—Set 3 (JPS3). 5.6.8 job-constraints-supported." Jul. 27, 2012: 35.

* cited by examiner

FIG. 5
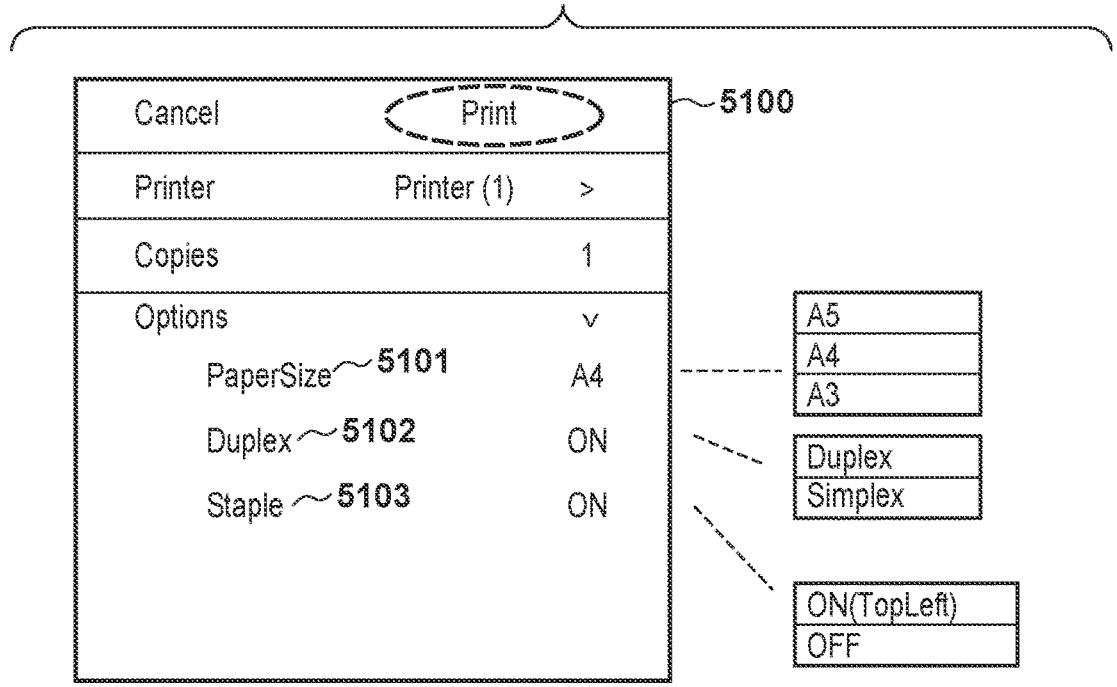
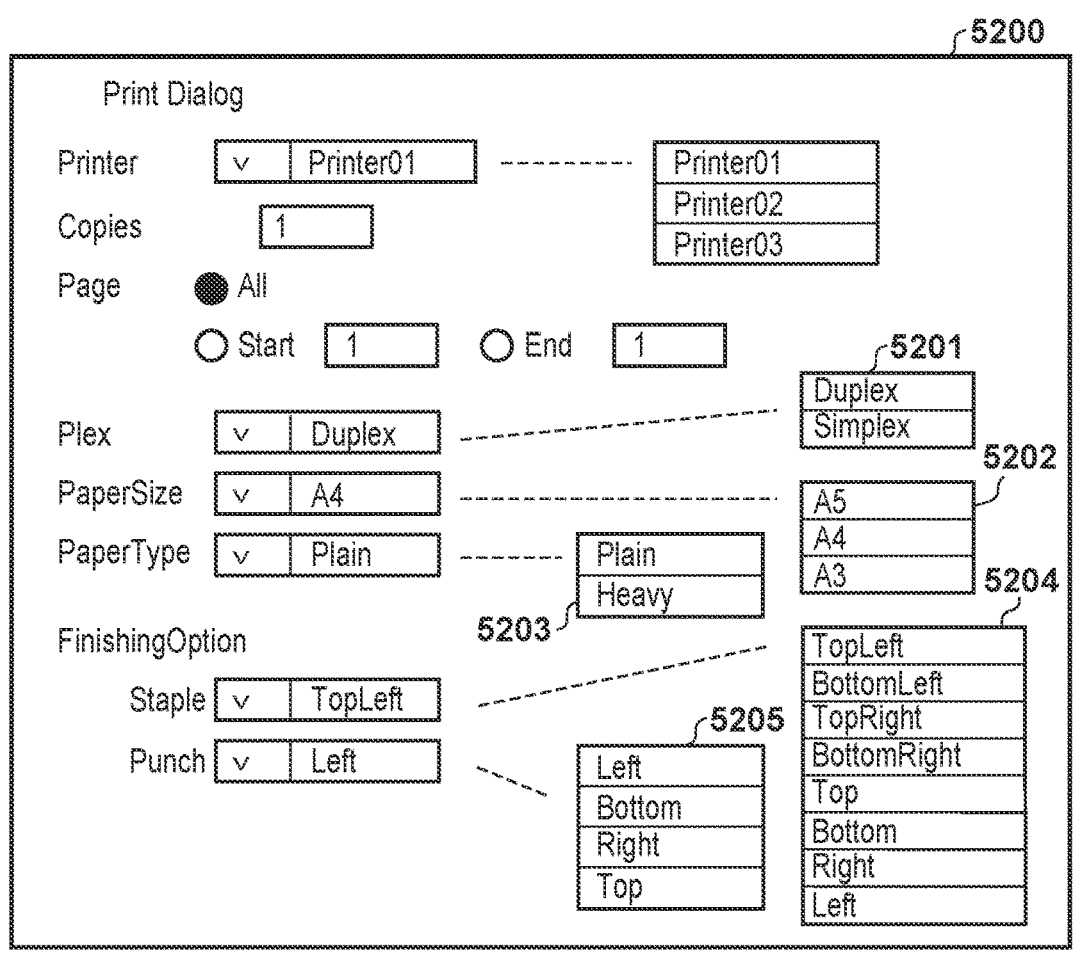

FIG. 6

●EXAMPLE OF CAPABILITY REQUEST/NOTIFICATION OF PRINTER  ─6100

"Hyptertext Transfer Protocol"
  POST /ipp/print HTTP/1.1/
  Content-Length : XXX
  Content-Type : application/ipp
  Host : GanonXXXX.local:631

User-Agent : CUPS/2.2.3 (XXXOS Version11.0)  ─6101

Expect : 100-continue

"Internet Printing Protocol"
  Request = (
    operation-id: Get-Printer-Attributes operation-attributes-tag = {
        "attributes-charset" = "utf-8";
        "attributes-natural-language" = ja-jp;
        "printer-uri" = "ipp://xxxx.local.:631/ipp/print";
                                                                    6102
        "requested-attributes (keyword) : 'copies-supported','document-format-supported','job-constraints-supported',"
  }

─6200

"Hypertext Transport Protocol"
  HTTP/1.1 200 OK
  Server : GANON HTTP Server
  Content-Length : XXX
  Content-Type : application/ipp
  Connection : close "Internet Printing Protocol"
  Response = (
    operation-attributes-tag {
        "attributes-charset" = "utf-8";
        "attributes-natural-language" = "ja-jp";
    };
    printer-attributes-tag (                                        6201
        copies-supported : 1-9999
        document-format-supported: 'application/octet-stream','image/pwg-raster','image/jpeg','application/pdf'
        job-constraints-supported={
                                                         ─6202
            resolver-name="rule01"
              sides={
                "double-sided-long-edge"
                "double-sided-short-edge"      ─6203
              }
              media-col={
                media-type="stationery-heavyweight"
              }
            ...
        } end-of-attribute-tag

SETTINGS OF PROHIBITION LEVEL TO BE TRANSMITTED TO CLIENT — 801

- ☑ LIMIT TO MAIN PRINT SETTINGS — 802
- ☐ LIMIT NUMBER OF PROHIBITED ITEMS TO 2 — 804
- ☐ EXCLUDE THE VENDER-SPECIFIC SETTINGS — 805

[ SETTINGS FOR MAIN PRINT SETTINGS ] — 803

SETTINGS FOR MAIN PRINT SETTINGS — 901

- ☑ PAPER TYPE
- ☑ PAPER SIZE
- ☑ PAPER FEED POSITION
- ☑ DOUBLE-SIDED
- ☑ STAPLING
- ☐ PUNCHING
- ☐ RESOLUTION
- ☐ STAMP PRINT
- ☐ COPY-FORGERY-INHIBITED PATTERN PRINT

● EXAMPLE OF PRINT SETTING VERIFICATION

"Hyptertext Transfer Protocol"
  POST /ipp/print HTTP/1.1/
  Content-Length : XXX
  Content-Type : application/ipp
  Host : GanonXXXX.local:631

User-Agent : CUPS/2.2.3 (XXXOS Version11.0)    ~1001

Expect : 100-continue

"Internet Printing Protocol"
  Request = {
    operation-id: Validate-Job (0X0004)

operation-attributes-tag = {
      attributes-charset (charset): 'utf-8'
      attributes-natural-language (naturalLanguage): 'ja-jp'
      printer-uri (uri): 'ipp://Ganon5F3D9D.local.:631/ipp/print'
    } job-attributes-tag ={
      media-type (keyword): 'stationery-heavyweight'
      sides (keyword): 'one-sided
    }'                                             ~1002 end-of-attributes-tag
  }

~1000

"Hypertext Transport Protocol"
  HTTP/1.1 200 OK
  Server : GANON HTTP Server
  Content-Length : XXX
  Content-Type : application/ipp
  Connection : close "Internet Printing Protocol"
Validate-Job Response
  version: 2.0
  status-code: Successful (successful-ok)          ~1011
  operation-attributes-tag
    attributes-charset (charset): 'utf-8'
    attributes-natural-language (naturalLanguage): 'ja-jp'
  end-of-attributes-tag

| A | B | C |
|---|---|---|
| MANAGEMENT NUMBER | NUMBER OF PROHIBITION ITEMS (EACH CONDITION) | RULE DESCRIPTION |
| 1 | 2 | DOUBLE-SIDED NOT POSSIBLE FOR THICK PAPER |
| 2 | 2 | CANNOT STAPLE ON TOP LEFT OF PAPER FOR A5 |
| 3 | 2 | CANNOT STAPLE ON BOTTOM LEFT OF PAPER FOR A5 |
| 4 | 2 | CANNOT STAPLE ON BOTTOM RIGHT OF PAPER FOR A5 |
| 5 | 2 | CANNOT STAPLE ON TOP RIGHT OF PAPER FOR A5 |
| 6 | 2 | CANNOT STAPLE ON LEFT OF PAPER FOR A5 |
| 7 | 2 | CANNOT STAPLE ON BOTTOM OF PAPER FOR A5 |
| 8 | 2 | CANNOT STAPLE ON RIGHT PAPER FOR A5 |
| 9 | 2 | CANNOT STAPLE ON TOP OF PAPER FOR A5 |
| 10 | 2 | CANNOT PUNCH ON LEFT OF PAPER FOR A5 |
| 11 | 2 | CANNOT PUNCH ON BOTTOM OF PAPER FOR A5 |
| 12 | 2 | CANNOT PUNCH ON RIGHT OF PAPER FOR A5 |
| 13 | 2 | A5 CANNOT PUNCH ON TOP OF PAPER |
| 14 | 2 | CANNOT STAPLE ON LEFT FOR A3 |
| 15 | 2 | CANNOT STAPLE ON RIGHT FOR A3 |
| 16 | 2 | CANNOT PUNCH ON LEFT FOR A3 |
| 17 | 2 | CANNOT PUNCH ON RIGHT FOR A3 |
| 18 | 2 | CANNOT C1 FEED FOR A3 |
| 19 | 2 | CANNOT STAMP PRINT FOR HIGH RESOLUTION |
| 20 | 2 | CANNOT COPY-FORGERY-INHIBITED PATTERN PRINT FOR HIGH RESOLUTION |
| 21 | 3 | CANNOT STAPLE ON BOTTOM OF PAPER BY C1 FEED FOR A4 |
| 22 | 3 | CANNOT STAPLE ON TOP OF PAPER BY C1 FEED FOR A4 |
| 23 | 3 | CANNOT PUNCH ON BOTTOM OF PAPER BY C1 FEED FOR A4 |
| 24 | 3 | CANNOT PUNCH ON TOP OF PAPER BY C1 FEED FOR A4 |

FIG. 11B

| MANAGEMENT NUMBER | PAPER TYPE | | | PAPER SIZE | | | PAPER FEED POSITION | | |
|---|---|---|---|---|---|---|---|---|---|
| | THIN PAPER | PLAIN PAPER | THICK PAPER | A5 | A4 | A3 | C1 | C2 | C3 |
| | D | E | F | G | H | I | J | K | L |
| 1 | F | F | T | F | F | F | F | F | F |
| 2 | F | F | F | T | F | F | F | F | F |
| 3 | F | F | F | T | F | F | F | F | F |
| 4 | F | F | F | T | F | F | F | F | F |
| 5 | F | F | F | T | F | F | F | F | F |
| 6 | F | F | F | T | F | F | F | F | F |
| 7 | F | F | F | T | F | F | F | F | F |
| 8 | F | F | F | T | F | F | F | F | F |
| 9 | F | F | F | T | F | F | F | F | F |
| 10 | F | F | F | T | F | F | F | F | F |
| 11 | F | F | F | T | F | F | F | F | F |
| 12 | F | F | F | T | F | F | F | F | F |
| 13 | F | F | F | T | F | F | F | F | F |
| 14 | F | F | F | F | F | T | F | F | F |
| 15 | F | F | F | F | F | T | F | F | F |
| 16 | F | F | F | F | F | T | F | F | F |
| 17 | F | F | F | F | F | T | F | F | F |
| 18 | F | F | F | F | F | F | T | F | F |
| 19 | F | F | F | F | F | F | F | F | F |
| 20 | F | F | F | F | F | F | F | F | F |
| 21 | F | F | F | T | F | F | T | F | F |
| 22 | F | F | F | T | F | F | T | F | F |
| 23 | F | F | F | T | F | F | T | F | F |
| 24 | F | F | F | T | F | F | T | F | F |

FIG. 11C

| A | M | N | O | P | Q |
|---|---|---|---|---|---|
| | | STAPLING (ONE POSITION) | | | |
| MANAGEMENT NUMBER | DOUBLE-SIDED | TOP LEFT | BOTTOM LEFT | BOTTOM RIGHT | TOP RIGHT |
| 1 | T | F | F | F | F |
| 2 | F | T | F | F | F |
| 3 | F | F | T | F | F |
| 4 | F | F | F | T | F |
| 5 | F | F | F | F | T |
| 6 | F | F | F | F | F |
| 7 | F | F | F | F | F |
| 8 | F | F | F | F | F |
| 9 | F | F | F | F | F |
| 10 | F | F | F | F | F |
| 11 | F | F | F | F | F |
| 12 | F | F | F | F | F |
| 13 | F | F | F | F | F |
| 14 | F | F | F | F | F |
| 15 | F | F | F | F | F |
| 16 | F | F | F | F | F |
| 17 | F | F | F | F | F |
| 18 | F | F | F | F | F |
| 19 | F | F | F | F | F |
| 20 | F | F | F | F | F |
| 21 | F | F | F | F | F |
| 22 | F | F | F | F | F |
| 23 | F | F | F | F | F |
| 24 | F | F | F | F | F |

FIG. 11D

| A<br>MANAGEMENT NUMBER | STAPLING (TWO POSITIONS) | | | | PUNCHING (TWO HOLES) | | | |
|---|---|---|---|---|---|---|---|---|
| | R<br>LEFT | S<br>BOTTOM | T<br>RIGHT | U<br>TOP | V<br>LEFT | W<br>BOTTOM | X<br>RIGHT | Y<br>TOP |
| 1 | F | F | F | F | F | F | F | F |
| 2 | F | F | F | F | F | F | F | F |
| 3 | F | F | F | F | F | F | F | F |
| 4 | F | F | F | F | F | F | F | F |
| 5 | F | F | F | F | F | F | F | F |
| 6 | T | F | F | F | F | F | F | F |
| 7 | F | T | F | F | F | F | F | F |
| 8 | F | F | T | F | F | F | F | F |
| 9 | F | F | F | T | F | F | F | F |
| 10 | F | F | F | F | T | F | F | F |
| 11 | F | F | F | F | F | T | F | F |
| 12 | F | F | F | F | F | F | T | F |
| 13 | F | F | F | F | F | F | F | T |
| 14 | T | F | F | T | F | F | F | F |
| 15 | F | F | T | F | T | F | F | F |
| 16 | F | F | F | F | F | F | F | F |
| 17 | F | F | F | T | F | T | F | F |
| 18 | F | F | F | F | F | F | F | F |
| 19 | F | F | F | F | F | F | F | F |
| 20 | F | F | F | F | F | F | F | F |
| 21 | F | F | F | F | F | F | F | F |
| 22 | F | F | F | F | F | T | F | F |
| 23 | F | F | F | F | F | F | F | F |
| 24 | F | F | F | F | F | F | F | T |

FIG. 11E

| MANAGEMENT NUMBER | RESOLUTION | | | STAMP (*) | COPY-FORGERY-INHIBITED PATTERN PRINT (*) |
|---|---|---|---|---|---|
| A | Z LOW | AA MIDDLE | AB HIGH | AC | AD |
| 1 | F | F | F | F | F |
| 2 | F | F | F | F | F |
| 3 | F | F | F | F | F |
| 4 | F | F | F | F | F |
| 5 | F | F | F | F | F |
| 6 | F | F | F | F | F |
| 7 | F | F | F | T | F |
| 8 | F | F | F | F | T |
| 9 | F | F | F | F | F |
| 10 | F | F | F | F | F |
| 11 | F | F | F | F | F |
| 12 | F | F | F | F | F |
| 13 | F | F | F | F | F |
| 14 | F | F | F | F | F |
| 15 | F | F | F | F | F |
| 16 | F | F | F | F | F |
| 17 | F | F | F | F | F |
| 18 | F | F | F | F | F |
| 19 | F | F | T | T | F |
| 20 | F | F | T | F | T |
| 21 | F | F | F | F | F |
| 22 | F | F | F | F | F |
| 23 | F | F | F | F | F |
| 24 | F | F | F | F | F |

(*) IS PRINT SETTING DEFINED BY VENDOR-SPECIFIC PRINTER. OTHER ATTRIBUTES DEFINED BY IPP

FIG. 12A

| A | B | C |
|---|---|---|
| MANAGEMENT NUMBER | NUMBER OF PROHIBITION ITEMS (EACH CONDITION) | RULE DESCRIPTION |
| 1 | 2 | DOUBLE-SIDED NOT POSSIBLE FOR THICK PAPER |
| 2 | 2 | CANNOT STAPLE ON TOP LEFT OF PAPER FOR A5 |
| 3 | 2 | CANNOT STAPLE ON BOTTOM LEFT OF PAPER FOR A5 |
| 4 | 2 | CANNOT STAPLE ON BOTTOM RIGHT OF PAPER FOR A5 |
| 5 | 2 | CANNOT STAPLE ON TOP RIGHT OF PAPER FOR A5 |
| 6 | 2 | CANNOT STAPLE ON LEFT OF PAPER FOR A5 |
| 7 | 2 | CANNOT STAPLE ON BOTTOM OF PAPER FOR A5 |
| 8 | 2 | CANNOT STAPLE ON RIGHT PAPER FOR A5 |
| 9 | 2 | CANNOT STAPLE ON TOP OF PAPER FOR A5 |
| 10 | 2 | CANNOT PUNCH ON LEFT OF PAPER FOR A5 |
| 11 | 2 | CANNOT PUNCH ON BOTTOM OF PAPER FOR A5 |
| 12 | 2 | CANNOT PUNCH ON RIGHT OF PAPER FOR A5 |
| 13 | 2 | A5: CANNOT PUNCH ON TOP OF PAPER |
| 14 | 2 | CANNOT STAPLE ON LEFT FOR A3 |
| 15 | 2 | CANNOT STAPLE ON RIGHT FOR A3 |
| 16 | 2 | CANNOT PUNCH ON LEFT FOR A3 |
| 17 | 2 | CANNOT PUNCH ON RIGHT FOR A3 |
| 18 | 2 | CANNOT C1 FEED FOR A3 |
| 19 | 2 | CANNOT STAMP PRINT FOR HIGH RESOLUTION |
| 20 | 2 | CANNOT COPY-FORGERY-INHIBITED PATTERN PRINT FOR HIGH RESOLUTION |
| 21 | 3 | CANNOT STAPLE ON BOTTOM OF PAPER BY C1 FEED FOR A4 |
| 22 | 3 | CANNOT STAPLE ON TOP OF PAPER BY C1 FEED FOR A4 |
| 23 | 3 | CANNOT PUNCH ON BOTTOM OF PAPER BY C1 FEED FOR A4 |
| 24 | 3 | CANNOT PUNCH ON TOP OF PAPER BY C1 FEED FOR A4 |

FIG. 12B

| MANAGEMENT NUMBER | PAPER TYPE | | | PAPER SIZE | | | PAPER FEED POSITION | | |
|---|---|---|---|---|---|---|---|---|---|
| | THIN PAPER | PLAIN PAPER | THICK PAPER | A5 | A4 | A3 | C1 | C2 | C3 |
| 1 | F | F | T | F | F | F | F | F | F |
| 2 | F | F | F | T | F | F | F | F | F |
| 3 | F | F | F | T | F | F | F | F | F |
| 4 | F | F | F | T | F | F | F | F | F |
| 5 | F | F | F | T | F | F | F | F | F |
| 6 | F | F | F | T | F | F | F | F | F |
| 7 | F | F | F | T | F | F | F | F | F |
| 8 | F | F | F | T | F | F | F | F | F |
| 9 | F | F | F | T | F | F | F | F | F |
| 10 | F | F | F | T | F | F | F | F | F |
| 11 | F | F | F | T | F | F | F | F | F |
| 12 | F | F | F | T | F | F | F | F | F |
| 13 | F | F | F | T | F | F | F | F | F |
| 14 | F | F | F | F | F | T | F | F | F |
| 15 | F | F | F | F | F | T | F | F | F |
| 16 | F | F | F | F | F | T | F | F | F |
| 17 | F | F | F | F | F | T | F | F | F |
| 18 | F | F | F | F | F | F | F | F | F |
| 19 | F | F | F | F | F | F | F | F | F |
| 20 | F | F | F | F | F | F | F | F | F |
| 21 | F | F | F | T | F | F | T | F | F |
| 22 | F | F | F | T | F | F | T | F | F |
| 23 | F | F | F | T | F | F | T | F | F |
| 24 | F | F | F | T | F | F | T | F | F |

FIG. 12C

| A | M | N | O | P | Q |
|---|---|---|---|---|---|
| | DOUBLE-SIDED | STAPLING (ONE POSITION) | | | |
| | | TOP LEFT | BOTTOM LEFT | BOTTOM RIGHT | TOP RIGHT |
| MANAGEMENT NUMBER | | | | | |
| 1 | T | F | F | F | F |
| 2 | F | T | F | F | F |
| 3 | F | F | T | F | F |
| 4 | F | F | F | T | F |
| 5 | F | F | F | F | T |
| 6 | F | F | F | F | F |
| 7 | F | F | F | F | F |
| 8 | F | F | F | F | F |
| 9 | F | F | F | F | F |
| 10 | F | F | F | F | F |
| 11 | F | F | F | F | F |
| 12 | F | F | F | F | F |
| 13 | F | F | F | F | F |
| 14 | F | F | F | F | F |
| 15 | F | F | F | F | F |
| 16 | F | F | F | F | F |
| 17 | F | F | F | F | F |
| 18 | F | F | F | F | F |
| 19 | F | F | F | F | F |
| 20 | F | F | F | F | F |
| 21 | F | F | F | F | F |
| 22 | F | F | F | F | F |
| 23 | F | F | F | F | F |
| 24 | F | F | F | F | F |

FIG. 12D

| A | R | S | T | U | V | W | X | Y |
|---|---|---|---|---|---|---|---|---|
| MANAGEMENT NUMBER | STAPLING (TWO POSITIONS) | | | | PUNCHING (TWO HOLES) | | | |
| | LEFT | BOTTOM | RIGHT | TOP | LEFT | BOTTOM | RIGHT | TOP |
| 1 | F | F | F | F | F | F | F | F |
| 2 | F | F | F | F | F | F | F | F |
| 3 | F | F | F | F | F | F | F | F |
| 4 | F | F | F | F | F | F | F | F |
| 5 | F | F | F | F | F | F | F | F |
| 6 | T | F | F | F | F | F | F | F |
| 7 | F | T | F | F | F | F | F | F |
| 8 | F | F | T | F | F | F | F | F |
| 9 | F | F | F | T | F | F | F | F |
| 10 | F | F | F | F | T | F | F | F |
| 11 | F | F | F | F | F | T | F | F |
| 12 | F | F | F | F | F | F | T | F |
| 13 | T | F | F | F | F | F | F | T |
| 14 | F | F | F | F | F | F | F | F |
| 15 | F | F | T | F | F | F | F | F |
| 16 | F | F | F | F | F | F | F | F |
| 17 | F | F | F | F | F | F | F | F |
| 18 | F | F | F | F | F | F | F | F |
| 19 | F | F | F | F | F | F | F | F |
| 20 | F | T | F | F | F | F | F | F |
| 21 | F | F | F | F | F | F | F | F |
| 22 | F | F | F | T | F | F | F | F |
| 23 | F | F | F | F | F | T | F | F |
| 24 | F | F | F | F | F | F | F | T |

FIG. 12E

| MANAGEMENT NUMBER | RESOLUTION | | | STAMP (*) | COPY-FORGERY-INHIBITED PATTERN PRINT (*) |
|---|---|---|---|---|---|
| A | Z / AA / AB | | | AC | AD |
| | LOW | MIDDLE | HIGH | | |
| 1 | F | F | F | F | F |
| 2 | F | F | F | F | F |
| 3 | F | F | F | F | F |
| 4 | F | F | F | F | F |
| 5 | F | F | F | F | F |
| 6 | F | F | F | F | F |
| 7 | F | F | F | T | F |
| 8 | F | F | F | F | T |
| 9 | F | F | F | F | F |
| 10 | F | F | F | F | F |
| 11 | F | F | F | F | F |
| 12 | F | F | F | F | F |
| 13 | F | F | F | F | F |
| 14 | F | F | F | F | F |
| 15 | F | F | F | F | F |
| 16 | F | F | F | F | F |
| 17 | F | F | F | F | F |
| 18 | F | F | F | F | F |
| 19 | F | F | T | T | T |
| 20 | F | F | F | F | F |
| 21 | F | F | F | F | F |
| 22 | F | F | F | F | F |
| 23 | F | F | F | F | F |
| 24 | F | F | F | F | F |

(*) IS PRINT SETTING DEFINED BY VENDOR-SPECIFIC PRINTER. OTHER ATTRIBUTES DEFINED BY IPP

FIG. 13A

| A | B | C |
|---|---|---|
| MANAGEMENT NUMBER | NUMBER OF PROHIBITION ITEMS (EACH CONDITION) | RULE DESCRIPTION |
| 1 | 2 | DOUBLE-SIDED NOT POSSIBLE FOR THICK PAPER |
| 2 | 2 | CANNOT STAPLE ON TOP LEFT OF PAPER FOR A5 |
| 3 | 2 | CANNOT STAPLE ON BOTTOM LEFT OF PAPER FOR A5 |
| 4 | 2 | CANNOT STAPLE ON BOTTOM RIGHT OF PAPER FOR A5 |
| 5 | 2 | CANNOT STAPLE ON TOP RIGHT OF PAPER FOR A5 |
| 6 | 2 | CANNOT STAPLE ON LEFT OF PAPER FOR A5 |
| 7 | 2 | CANNOT STAPLE ON BOTTOM OF PAPER FOR A5 |
| 8 | 2 | CANNOT STAPLE ON RIGHT PAPER FOR A5 |
| 9 | 2 | CANNOT STAPLE ON TOP OF PAPER FOR A5 |
| 10 | 2 | CANNOT PUNCH ON LEFT OF PAPER FOR A5 |
| 11 | 2 | CANNOT PUNCH ON BOTTOM OF PAPER FOR A5 |
| 12 | 2 | CANNOT PUNCH ON RIGHT OF PAPER FOR A5 |
| 13 | 2 | A5 CANNOT PUNCH ON TOP OF PAPER |
| 14 | 2 | CANNOT STAPLE ON LEFT FOR A3 |
| 15 | 2 | CANNOT STAPLE ON RIGHT FOR A3 |
| 16 | 2 | CANNOT PUNCH ON LEFT FOR A3 |
| 17 | 2 | CANNOT PUNCH ON RIGHT FOR A3 |
| 18 | 2 | CANNOT C1 FEED FOR A3 |
| 19 | 2 | CANNOT STAMP PRINT FOR HIGH RESOLUTION |
| 20 | 2 | CANNOT COPY-FORGERY-INHIBITED PATTERN PRINT FOR HIGH RESOLUTION |
| 21 | 3 | CANNOT STAPLE ON BOTTOM OF PAPER BY C1 FEED FOR A4 |
| 22 | 3 | CANNOT STAPLE ON TOP OF PAPER BY C1 FEED FOR A4 |
| 23 | 3 | CANNOT PUNCH ON BOTTOM OF PAPER BY C1 FEED FOR A4 |
| 24 | 3 | CANNOT PUNCH ON TOP OF PAPER BY C1 FEED FOR A4 |

FIG. 13B

| A | D | E | F | G | H | I | J | K | L |
|---|---|---|---|---|---|---|---|---|---|
| | PAPER TYPE | | | PAPER SIZE | | | PAPER FEED POSITION | | |
| MANAGEMENT NUMBER | THIN PAPER | PLAIN PAPER | THICK PAPER | A5 | A4 | A3 | C1 | C2 | C3 |
| 1 | F | F | T | F | F | F | F | F | F |
| 2 | F | F | F | F | F | F | F | F | F |
| 3 | F | F | F | T | F | F | F | F | F |
| 4 | F | F | F | T | F | F | F | F | F |
| 5 | F | F | F | T | F | F | F | F | F |
| 6 | F | F | F | T | F | F | F | F | F |
| 7 | F | F | F | T | F | F | F | F | F |
| 8 | F | F | F | T | F | F | F | F | F |
| 9 | F | F | F | T | F | F | F | F | F |
| 10 | F | F | F | T | F | F | F | F | F |
| 11 | F | F | F | T | F | F | F | F | F |
| 12 | F | F | F | T | F | F | F | F | F |
| 13 | F | F | F | T | F | F | F | F | F |
| 14 | F | F | F | F | F | T | F | F | F |
| 15 | F | F | F | F | F | T | F | F | F |
| 16 | F | F | F | F | F | T | F | F | F |
| 17 | F | F | F | F | F | T | F | F | F |
| 18 | F | F | F | F | F | T | T | F | F |
| 19 | F | F | F | F | F | F | F | F | F |
| 20 | F | F | F | F | F | F | F | F | F |
| 21 | F | F | F | T | F | F | T | F | F |
| 22 | F | F | F | T | F | F | T | F | F |
| 23 | F | F | F | T | F | F | T | F | F |
| 24 | F | F | F | T | F | F | T | F | F |

FIG. 13C

| MANAGEMENT NUMBER | DOUBLE-SIDED | STAPLING (ONE POSITION) | | | |
|---|---|---|---|---|---|
| A | M | N | O | P | Q |
| | | TOP LEFT | BOTTOM LEFT | BOTTOM RIGHT | TOP RIGHT |
| 1 | T | F | F | F | F |
| 2 | F | T | F | F | F |
| 3 | F | F | T | F | F |
| 4 | F | F | F | T | F |
| 5 | F | F | F | F | T |
| 6 | F | F | F | F | F |
| 7 | F | F | F | F | F |
| 8 | F | F | F | F | F |
| 9 | F | F | F | F | F |
| 10 | F | F | F | F | F |
| 11 | F | F | F | F | F |
| 12 | F | F | F | F | F |
| 13 | F | F | F | F | F |
| 14 | F | F | F | F | F |
| 15 | F | F | F | F | F |
| 16 | F | F | F | F | F |
| 17 | F | F | F | F | F |
| 18 | F | F | F | F | F |
| 19 | F | F | F | F | F |
| 20 | F | F | F | F | F |
| 21 | F | F | F | F | F |
| 22 | F | F | F | F | F |
| 23 | F | F | F | F | F |
| 24 | F | F | F | F | F |

FIG. 13D

| MANAGEMENT NUMBER | STAPLING (TWO POSITIONS) | | | PUNCHING (TWO HOLES) | | | | |
|---|---|---|---|---|---|---|---|---|
| A | R | S | T | U | V | W | X | Y |
| | LEFT | BOTTOM | RIGHT | TOP | LEFT | BOTTOM | RIGHT | TOP |
| 1 | F | F | F | F | F | F | F | F |
| 2 | F | F | F | F | F | F | F | F |
| 3 | F | F | F | F | F | F | F | F |
| 4 | F | F | F | F | F | F | F | F |
| 5 | F | F | F | F | F | F | F | F |
| 6 | T | F | F | F | F | F | F | F |
| 7 | F | T | F | F | F | F | F | F |
| 8 | F | F | T | F | F | F | F | F |
| 9 | F | F | F | T | F | F | F | F |
| 10 | F | F | F | F | T | F | F | F |
| 11 | F | F | F | F | F | T | F | F |
| 12 | F | F | F | F | F | F | T | F |
| 13 | F | F | F | F | F | F | F | T |
| 14 | T | F | F | F | F | F | F | F |
| 15 | F | F | T | F | F | F | F | F |
| 16 | F | F | F | F | F | F | T | F |
| 17 | F | F | F | F | F | F | F | F |
| 18 | F | F | F | F | F | F | F | F |
| 19 | F | F | F | F | F | F | F | F |
| 20 | F | F | F | F | F | F | F | F |
| 21 | F | T | F | F | F | F | F | F |
| 22 | F | F | F | T | F | F | F | F |
| 23 | F | F | F | F | F | T | F | F |
| 24 | F | F | F | F | F | F | F | T |

FIG. 13E

| MANAGEMENT NUMBER | RESOLUTION | | | STAMP (*) | COPY-FORGERY-INHIBITED PATTERN PRINT (*) |
|---|---|---|---|---|---|
| | LOW | MIDDLE | HIGH | | |
| A | Z | AA | AB | AC | AD |
| 1 | F | F | F | F | F |
| 2 | F | F | F | F | F |
| 3 | F | F | F | F | F |
| 4 | F | F | F | F | F |
| 5 | F | F | F | F | F |
| 6 | F | F | F | F | F |
| 7 | F | F | F | T | F |
| 8 | F | F | F | F | T |
| 9 | F | F | F | F | F |
| 10 | F | F | F | F | F |
| 11 | F | F | F | F | F |
| 12 | F | F | F | F | F |
| 13 | F | F | F | F | F |
| 14 | F | F | F | F | F |
| 15 | F | F | F | F | F |
| 16 | F | F | F | F | F |
| 17 | F | F | F | F | F |
| 18 | F | F | F | F | F |
| 19 | F | F | T | F | F |
| 20 | F | F | T | T | T |
| 21 | F | F | F | F | F |
| 22 | F | F | F | F | F |
| 23 | F | F | F | F | F |
| 24 | F | F | F | F | F |

(*) IS PRINT SETTING DEFINED BY VENDOR-SPECIFIC PRINTER. OTHER ATTRIBUTES DEFINED BY IPP

FIG. 14A

| A | B | C |
|---|---|---|
| MANAGEMENT NUMBER | NUMBER OF PROHIBITION ITEMS (EACH CONDITION) | RULE DESCRIPTION |
| 1 | 2 | DOUBLE-SIDED NOT POSSIBLE FOR THICK PAPER |
| 2 | 2 | CANNOT STAPLE ON TOP LEFT OF PAPER FOR A5 |
| 3 | 2 | CANNOT STAPLE ON BOTTOM LEFT OF PAPER FOR A5 |
| 4 | 2 | CANNOT STAPLE ON BOTTOM RIGHT OF PAPER FOR A5 |
| 5 | 2 | CANNOT STAPLE ON TOP RIGHT OF PAPER FOR A5 |
| 6 | 2 | CANNOT STAPLE ON LEFT OF PAPER FOR A5 |
| 7 | 2 | CANNOT STAPLE ON BOTTOM OF PAPER FOR A5 |
| 8 | 2 | CANNOT STAPLE ON RIGHT PAPER FOR A5 |
| 9 | 2 | CANNOT STAPLE ON TOP OF PAPER FOR A5 |
| 10 | 2 | CANNOT PUNCH ON LEFT OF PAPER FOR A5 |
| 11 | 2 | CANNOT PUNCH ON BOTTOM OF PAPER FOR A5 |
| 12 | 2 | CANNOT PUNCH ON RIGHT OF PAPER FOR A5 |
| 13 | 2 | A5 CANNOT PUNCH ON TOP OF PAPER |
| 14 | 2 | CANNOT STAPLE ON LEFT FOR A3 |
| 15 | 2 | CANNOT STAPLE ON RIGHT FOR A3 |
| 16 | 2 | CANNOT PUNCH ON LEFT FOR A3 |
| 17 | 2 | CANNOT PUNCH ON RIGHT FOR A3 |
| 18 | 2 | CANNOT C1 FEED FOR A3 |
| 19 | 2 | CANNOT STAMP PRINT FOR HIGH RESOLUTION |
| 20 | 2 | CANNOT COPY-FORGERY-INHIBITED PATTERN PRINT FOR HIGH RESOLUTION |
| 21 | 3 | CANNOT STAPLE ON BOTTOM OF PAPER BY C1 FEED FOR A4 |
| 22 | 3 | CANNOT STAPLE ON TOP OF PAPER BY C1 FEED FOR A4 |
| 23 | 3 | CANNOT PUNCH ON BOTTOM OF PAPER BY C1 FEED FOR A4 |
| 24 | 3 | CANNOT PUNCH ON TOP OF PAPER BY C1 FEED FOR A4 |

FIG. 14B

| A | D | E | F | G | H | I | J | K | L |
|---|---|---|---|---|---|---|---|---|---|
| | PAPER TYPE | | | PAPER SIZE | | | PAPER FEED POSITION | | |
| MANAGEMENT NUMBER | THIN PAPER | PLAIN PAPER | THICK PAPER | A5 | A4 | A3 | C1 | C2 | C3 |
| 1 | F | F | T | F | F | F | F | F | F |
| 2 | F | F | F | T | F | F | F | F | F |
| 3 | F | F | F | T | F | F | F | F | F |
| 4 | F | F | F | T | F | F | F | F | F |
| 5 | F | F | F | T | F | F | F | F | F |
| 6 | F | F | F | T | F | F | F | F | F |
| 7 | F | F | F | T | F | F | F | F | F |
| 8 | F | F | F | T | F | F | F | F | F |
| 9 | F | F | F | T | F | F | F | F | F |
| 10 | F | F | F | T | F | F | F | F | F |
| 11 | F | F | F | T | F | F | F | F | F |
| 12 | F | F | F | T | F | F | F | F | F |
| 13 | F | F | F | T | F | F | F | F | F |
| 14 | F | F | F | F | F | T | F | F | F |
| 15 | F | F | F | F | F | T | F | F | F |
| 16 | F | F | F | F | F | T | F | F | F |
| 17 | F | F | F | F | F | T | F | F | F |
| 18 | F | F | F | F | F | F | F | F | F |
| 19 | F | F | F | F | F | F | F | F | F |
| 20 | F | F | F | F | F | F | F | F | F |
| 21 | F | F | F | T | F | F | T | F | F |
| 22 | F | F | F | T | F | F | T | F | F |
| 23 | F | F | F | T | F | F | T | F | F |
| 24 | F | F | F | T | F | F | T | F | F |

FIG. 14C

| A | M | N | O | P | Q |
|---|---|---|---|---|---|
| | | STAPLING (ONE POSITION) | | | |
| MANAGEMENT NUMBER | DOUBLE-SIDED | TOP LEFT | BOTTOM LEFT | BOTTOM RIGHT | TOP RIGHT |
| 1 | T | F | F | F | F |
| 2 | F | T | F | F | F |
| 3 | F | F | T | F | F |
| 4 | F | F | F | T | F |
| 5 | F | F | F | F | T |
| 6 | F | F | F | F | F |
| 7 | F | F | F | F | F |
| 8 | F | F | F | F | F |
| 9 | F | F | F | F | F |
| 10 | F | F | F | F | F |
| 11 | F | F | F | F | F |
| 12 | F | F | F | F | F |
| 13 | F | F | F | F | F |
| 14 | F | F | F | F | F |
| 15 | F | F | F | F | F |
| 16 | F | F | F | F | F |
| 17 | F | F | F | F | F |
| 18 | F | F | F | F | F |
| 19 | F | F | F | F | F |
| 20 | F | F | F | F | F |
| 21 | F | F | F | F | F |
| 22 | F | F | F | F | F |
| 23 | F | F | F | F | F |
| 24 | F | F | F | F | F |

FIG. 14D

| A | R | S | T | U | V | W | X | Y |
|---|---|---|---|---|---|---|---|---|
| | STAPLING (TWO POSITIONS) | | | | PUNCHING (TWO HOLES) | | | |
| MANAGEMENT NUMBER | LEFT | BOTTOM | RIGHT | TOP | LEFT | BOTTOM | RIGHT | TOP |
| 1 | F | F | F | F | F | F | F | F |
| 2 | F | F | F | F | F | F | F | F |
| 3 | F | F | F | F | F | F | F | F |
| 4 | F | F | F | F | F | F | F | F |
| 5 | F | F | F | F | F | F | F | F |
| 6 | T | F | F | F | F | F | F | F |
| 7 | F | T | F | F | F | F | F | F |
| 8 | F | F | T | F | F | F | F | F |
| 9 | F | F | F | T | F | F | F | F |
| 10 | F | F | F | F | T | F | F | F |
| 11 | F | F | F | F | F | T | F | F |
| 12 | F | F | F | F | F | F | T | F |
| 13 | F | F | F | F | F | F | F | T |
| 14 | T | F | F | F | F | F | F | F |
| 15 | F | F | T | F | F | F | F | F |
| 16 | F | F | F | F | T | F | F | F |
| 17 | F | F | F | F | F | F | T | F |
| 18 | F | F | F | F | F | F | F | F |
| 19 | F | F | F | F | F | F | F | F |
| 20 | F | F | F | F | F | F | F | F |
| 21 | F | F | F | T | F | F | F | F |
| 22 | F | T | F | F | F | T | F | F |
| 23 | F | F | F | F | F | F | F | T |
| 24 | F | F | F | F | F | F | F | F |

FIG. 14E

| A | Z | AA | AB | AC | AD |
|---|---|---|---|---|---|
| MANAGEMENT NUMBER | RESOLUTION | | | STAMP (*) | COPY-FORGERY-INHIBITED PATTERN PRINT (*) |
| | LOW | MIDDLE | HIGH | | |
| 1 | F | F | F | F | F |
| 2 | F | F | F | F | F |
| 3 | F | F | F | F | F |
| 4 | F | F | F | F | F |
| 5 | F | F | F | F | F |
| 6 | F | F | F | F | F |
| 7 | F | F | F | T | F |
| 8 | F | F | F | F | T |
| 9 | F | F | F | F | F |
| 10 | F | F | F | F | F |
| 11 | F | F | F | F | F |
| 12 | F | F | F | F | F |
| 13 | F | F | F | F | F |
| 14 | F | F | F | F | F |
| 15 | F | F | F | F | F |
| 16 | F | F | F | F | F |
| 17 | F | F | F | F | F |
| 18 | F | F | F | F | F |
| 19 | F | F | T | T | T |
| 20 | F | F | T | F | T |
| 21 | F | F | F | F | F |
| 22 | F | F | F | F | F |
| 23 | F | F | F | F | F |
| 24 | F | F | F | F | F |

(*) IS PRINT SETTING DEFINED BY VENDOR-SPECIFIC PRINTER. OTHER ATTRIBUTES DEFINED BY IPP

PRINTING APPARATUS, CONTROL METHOD THEREFOR, AND NON-TRANSITORY COMPUTER-READABLE STORAGE MEDIUM

BACKGROUND OF THE INVENTION

Field of the Invention

The present invention relates to a printing apparatus, a control method therefor, and a non-transitory computer-readable storage medium.

Description of the Related Art

There is a printing apparatus that receives print data from an information processing apparatus, which is an external apparatus, and prints it. It is known that the information processing apparatus generates print data using a print driver (or print application) designed for each printing apparatus. However, among recent information processing apparatuses, it is becoming popular to generate print data without intervention of a print driver (or print application) designed for each printing apparatus. For example, in recent print applications and print services on a cloud, print data complying with the IPP standard (IPP: Internet Printing Protocol) can be generated and transmitted to a printing apparatus without intervention of a specific print driver.

As described above, a printing apparatus is in an environment in which print jobs are received from various devices, but it is desirable that each print job includes print settings and print data that can be processed by the printing apparatus. However, a large amount of information is required to hold different functions, specifications, and prohibition conditions for each printing apparatus in each information processing apparatus, so it is desirable to acquire these from the printing apparatus or query the printing apparatus for them. Document 1 (RFC8011, [January 2017], 4.2.3 Validate-Job Operation, 4.2.5 Get-Printer-Attributes Operation, 5.4.15 operations-supported (vendor extentions)) describes a mechanism in which, in IPP printing, a query is made for a response of printing apparatus capabilities and the printing apparatus verifies print settings. Document 2 (PWG 5100.13 Job and Printer Extensions, [Jul. 27, 2012], 5.6.8 job-constraints-supported) describes a mechanism in which an information processing apparatus queries prohibition information of a printing apparatus.

However, the above-described related arts suffer the following problems. For example, in the above-described related art, a printer driver that supports common printing apparatuses provides a plurality of print settings such as paper type selections, image quality settings, and finishing process selections, but there is a case in which a plurality of functions cannot be used simultaneously (settings conflict with each other), depending on the settings. This is usually called "prohibition information", and some kind of feedback is provided to a user as a combination that cannot be specified. The print driver provided by a printer vendor holds the "prohibition information" optimized for each printer in a program in advance, and limits unavailable combinations of items on a print setting screen.

On the other hand, in IPP printing adopted for printing from a mobile device, the print client does not include individual printer drivers, so that it dynamically generates a print screen and prohibition information based on the capability information acquired from a printing apparatus. Although it depends on the client implementation, the printing apparatus needs to retransmit the prohibition information each time. However, if all pieces of the "prohibition information" are transmitted to the information processing apparatus, the data size becomes large. Particularly, when communicating with a printing apparatus via a wireless LAN, problems such as a delay in display of the print screen on the information processing apparatus side may occur. From such background, in IPP printing, it is desirable that the prohibition information transferred from a printing apparatus to an information processing apparatus has a data size as small as possible.

SUMMARY OF THE INVENTION

The present invention enables realization of a mechanism for limiting the prohibition information related to settings to be transmitted from a printing apparatus to an external apparatus, thereby reducing the amount of transmission data, as well as appropriately performing a prohibition process.

One aspect of the present invention provides a printing apparatus comprising: a memory device that stores a set of instructions; and at least one processor that executes the set of instructions to: notify an information processing apparatus of information indicating a combination of print settings that conflict with each other, receive print settings set in the information processing apparatus while avoiding the combination indicated by the information, determine whether the received print settings include settings that conflict with each other, based on information which is different from the notified information and indicates another combination of print settings that conflict with each other, and notify the information processing apparatus of a result of the determination.

Another aspect of the present invention provides a control method for a printing apparatus, the method comprising: notifying an information processing apparatus of information indicating a combination of print settings that conflict with each other, receiving print settings set in the information processing apparatus while avoiding the combination indicated by the information, determining whether the received print settings include settings that conflict with each other, based on information which is different from the notified information and indicates another combination of print settings that conflict with each other, and notifying the information processing apparatus of a result of the determination.

Still another aspect of the present invention provides a non-transitory computer-readable storage medium storing a computer program for causing a computer to execute respective steps in a control method for a printing apparatus, the method comprising: notifying an information processing apparatus of information indicating a combination of print settings that conflict with each other, receiving print settings set in the information processing apparatus while avoiding the combination indicated by the information, determining whether the received print settings include settings that conflict with each other, based on information which is different from the notified information and indicates another combination of print settings that conflict with each other, and notifying the information processing apparatus of a result of the determination.

Further features of the present invention will be apparent from the following description of exemplary embodiments with reference to the attached drawings.

BRIEF DESCRIPTION OF THE DRAWINGS

FIG. 5 is a view showing UI screens each for the information processing apparatus;

FIG. 6 is a view showing an example of the contents of IPP communication between the information processing apparatus and the printing apparatus;

FIG. 8 is a view showing the UI screen of the printing apparatus;

FIG. 9 is a view showing the UI screen of the printing apparatus;

FIG. 10 is a view showing an example of the contents of IPP communication between the information processing apparatus and the printing apparatus;

FIGS. 11A-11E are a view showing a list of prohibition conditions of the printing apparatus;

FIGS. 12A-12E are a view showing an example of a prohibition condition reduction based on major print settings;

FIGS. 13A-13E are a view showing an example of the prohibition condition reduction based on prohibition items; and FIGS. 14A-14E are a view showing an example of the prohibition condition reduction based on vendor-specific setting items.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

A multi function peripheral (digital multi function peripheral/MFP) will be described as an example of a printing apparatus according to the embodiment. However, the present invention can be applied to an electrophotographic printing apparatus such as a laser printer or a FAX machine without departing from the spirit and scope of the present invention. Further, the present invention need not limit the application target to the printing apparatus, and can also be applied to an information processing apparatus that does not have an image forming function or an image processing function.

<System Configuration>

Figure 1:
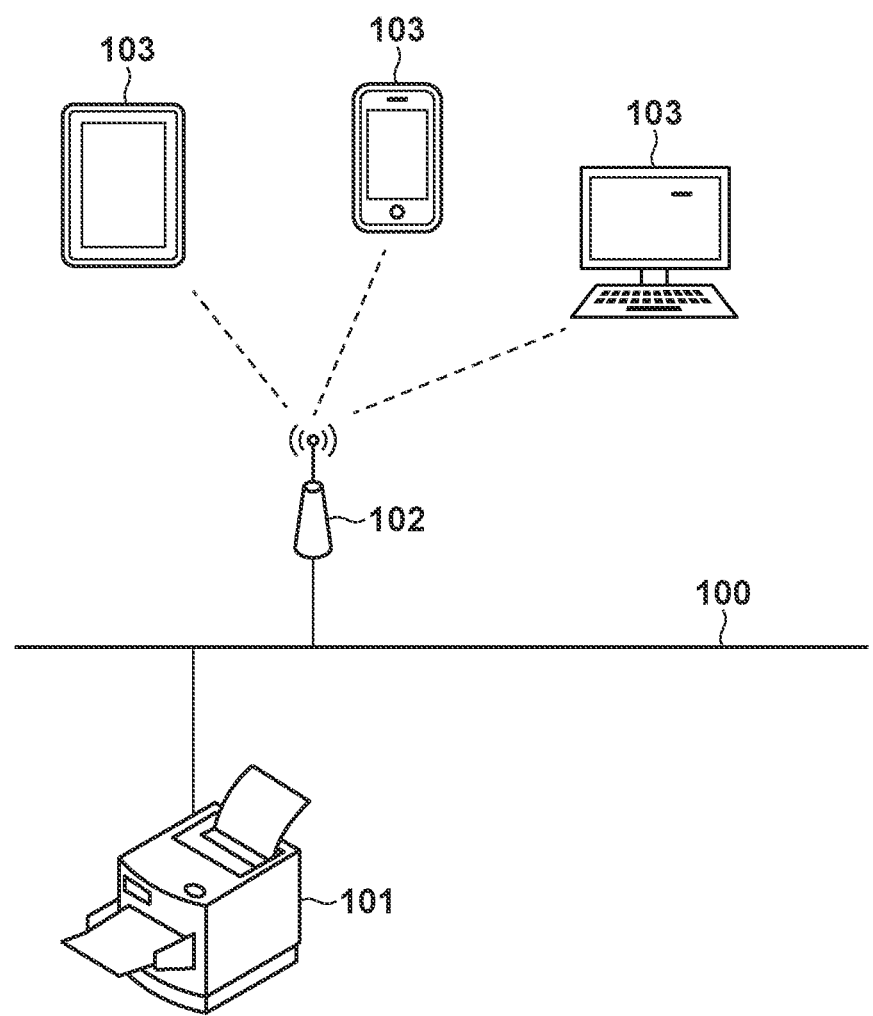
FIG. 1 is a view for explaining the configuration of a printing system of the present invention.

An embodiment of the present invention will be described below with reference to the accompanying drawings. First, the configuration of a printing system according to the embodiment will be described with reference to FIG. 1.

A printing apparatus 101 and an AP (Access Point) 102 are communicably connected to each other on a LAN (Local Area Network) 100. Also, information processing apparatuses 103, which are external apparatuses, are connected to the LAN 100 via the AP 102. In this embodiment, terminals such as a tablet, a smartphone, and a PC will be exemplified as the information processing apparatuses 103. Note that in the following description, the tablet, smartphone, PC, and the like are collectively referred to as the information processing apparatus 103. The information processing apparatus 103 can communicate with the printing apparatus 101 on the LAN 100 via the AP 102. When a print job request is received from the information processing apparatus 103, the printing apparatus 101 performs a print process of printing an image on a sheet (print medium). That is, the printing apparatus 101 can perform a print process based on print data received via a network.

In this embodiment, the above-described configuration example will be described as an example of the printing system, but the present invention is not limited to this, and it is sufficient that at least one or more information processing apparatuses 103 and the printing apparatus 101 are communicably connected to each other via a network. The network may be wireless or wired. In addition, the information processing apparatus 103 communicates with the printing apparatus 101 via the AP 102 in this embodiment, but the information processing apparatus 103 may communicate with the printing apparatus 101 directly by Wi-Fi Direct or the like.

<Hardware Arrangement of Printing Apparatus>

Figure 2:
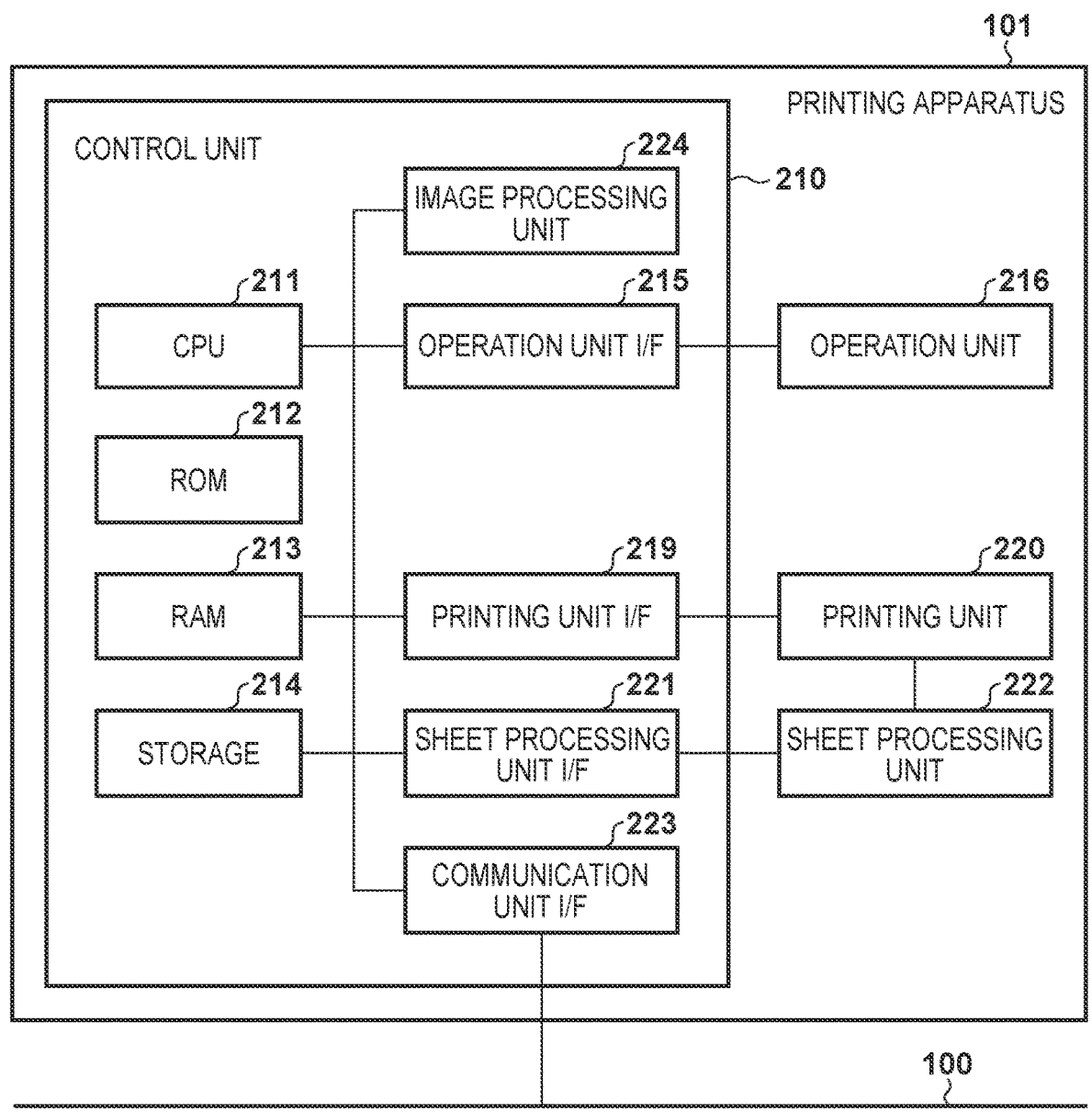
FIG. 2 is a block diagram for explaining the hardware arrangement of a printing apparatus.

Next, the hardware arrangement of the printing apparatus 101 according to this embodiment will be described with reference to FIG. 2. The printing apparatus 101 has a print function of printing an image on a sheet. The printing apparatus 101 will be described as an example in this embodiment, but an image forming apparatus such as an MFP (Multi Function Peripheral) which is a printing apparatus including scanner and FAX functions may also be used.

The printing apparatus 101 includes a control unit 210, an operation unit 216, a printing unit 220, and a sheet processing unit 222. The control unit 210 includes a CPU 211, a ROM 212, a RAM 213, a storage 214, an operation unit I/F 215, a printing unit I/F 219, a sheet processing unit I/F 221, a communication unit I/F 223, and an image processing unit 224.

The control unit 210 including the CPU (Central Processing Unit) 211 comprehensively controls the overall operation of the printing apparatus 101. The CPU 211 deploys programs stored in the ROM (Read Only Memory) 212 or the storage 214 in the RAM 213 and executes them to perform various kinds of control such as print control and read control. The ROM 212 stores control programs, boot programs, and the like that can be executed by the CPU 211. The RAM (random access memory) 213 is a main storage memory of the CPU 211 and used as a work area or a temporary storage area for deploying various kinds of control programs. The storage 214 stores print data, image data, various kinds of programs, and various kinds of setting information. In this embodiment, an auxiliary storage device such as an HDD (Hard Disk Drive) is assumed as the storage 214, but a non-volatile memory such as an SSD (Solid State Drive) may be used.

Note that in the printing apparatus 101 according to this embodiment, one CPU 211 executes respective processes illustrated in the flowchart to be described later using one memory (RAM 213), but another configuration may be used. For example, a plurality of CPUs, RAMs, ROMs, and storages may execute the respective processes illustrated in the flowchart to be described later in cooperation with each other. In addition, some of the processes may be performed using a hardware circuit such as an ASIC (Application Specific Integrated Circuit) or an FPGA (Field-Programmable Gate Array).

The operation unit interface (I/F) 215 connects the operation unit 216 and the control unit 210. The operation unit 216 is provided with a display unit having a touch panel function, various kinds of hard keys, or the like. Accordingly, the operation unit 216 functions as a display unit for displaying information and an acceptance unit for accepting a user instruction. The printing unit I/F 219 connects the printing unit (printer engine) 220 and the control unit 210. Image data generated by analyzing a print job received from the information processing apparatus 103 is transferred from the control unit 210 to the printing unit 220 via the printing unit I/F 219. The printing unit 220 receives a control command and a print job to be printed via the control unit 210, and prints an image on a sheet fed from a sheet feeding cassette (not shown) based on the print job. Note that the printing method of the printing unit 220 may be an electrophotographic method or an inkjet method. Other printing methods such as a thermal transfer method can also be applied. The control unit 210 is also connected to the LAN 100 via the communication unit I/F 223. The communication unit I/F 223 transmits image data and information to the information processing apparatus 103 on the LAN 100, and receives a print job and information from the information processing apparatus 103 on the LAN 100.

The image processing unit 224 has a function of a RIP (Raster Image Processor) for rasterizing a print job received via the LAN 100 to generate image data used for printing. The image processing unit 224 can also perform resolution conversion and correction processing of the image data obtained by rasterizing the print job. Note that in this embodiment, the image processing unit 224 is assumed to be implemented by a hardware circuit (such as an ASIC or an FPGA), but the present invention is not limited to this. For example, the printing apparatus 101 may further include a processor for image processing applications, and the processor may execute an image processing program to implement image processing or rasterization to print data. In this case, the processor and the CPU 211 cooperate to implement the flowchart to be described later. Further, the CPU 211 may be configured to execute an image processing program to perform image processing or rasterization to print data. Furthermore, image processing may be performed by any combination of them.

The sheet processing unit I/F 221 connects the control unit 210 and the sheet processing unit 222. The sheet processing unit 222 receives a control command from the control unit 210 and, in accordance with the control command, performs post-processing on a sheet having undergone printing by the printing unit 220. The post-processing such as aligning a plurality of sheets, binding a plurality of sheets, punching a hole in a sheet, folding a sheet, or the like is performed.

<Software Arrangement of Printing Apparatus>

Figure 3:
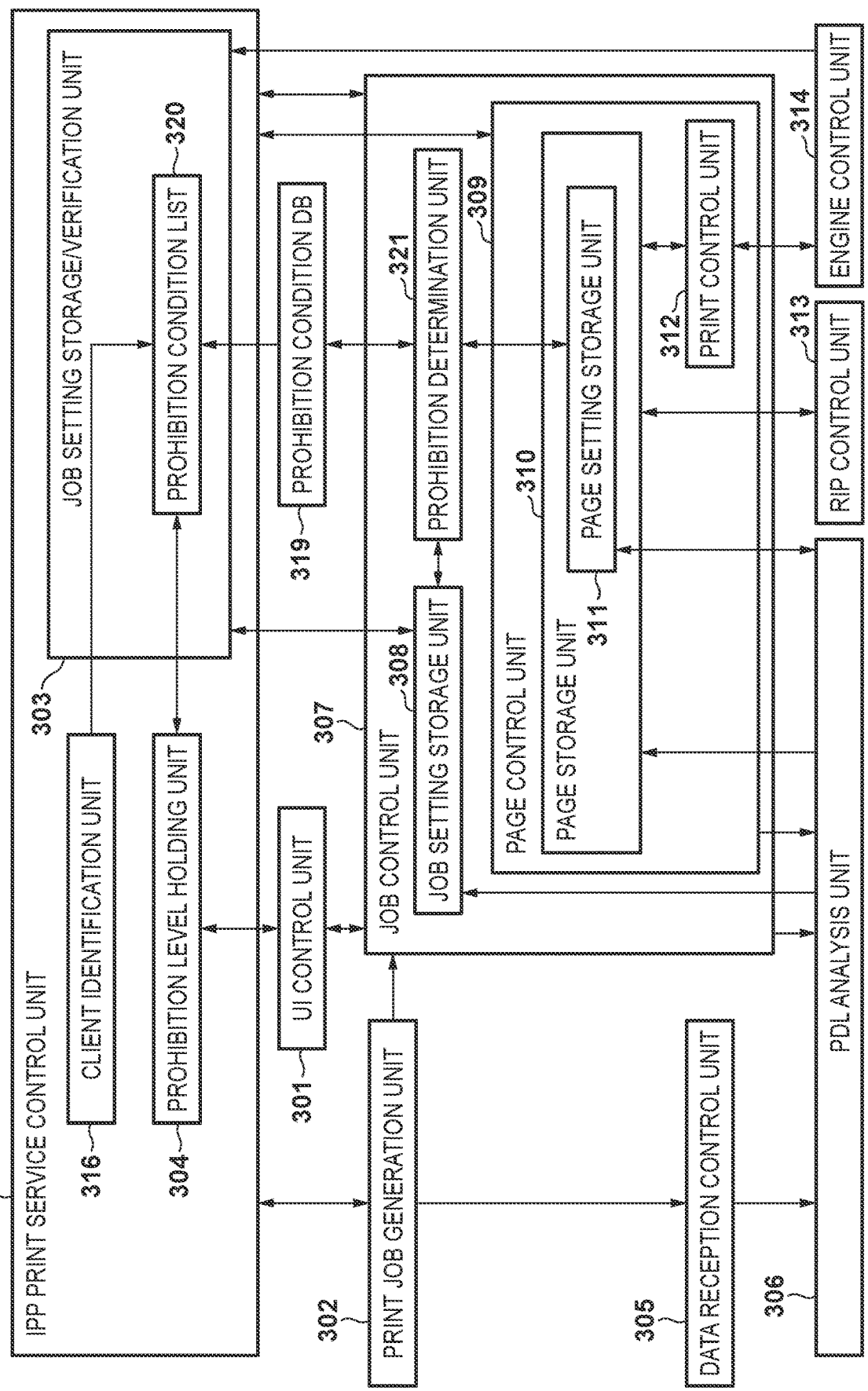
FIG. 3 is a functional block diagram for explaining the software arrangement of the printing apparatus.

Next, the software arrangement of the printing apparatus 101 according to this embodiment will be described with reference to FIG. 3. Note that in this embodiment, each functional block shown in FIG. 3 is achieved by the CPU 211 executing a program deployed in the RAM 213. As the software arrangement, the printing apparatus 101 includes a UI control unit 301, a print job generation unit 302, a job setting/storage/verification unit 303, a data reception control unit 305, a PDL analysis unit 306, and a job control unit 307. The printing apparatus 101 further includes a RIP control unit 313, an engine control unit 314, an IPP print service control unit 315, and a prohibition condition DB 319.

The IPP print service control unit 315 notifies the information processing apparatus 103 of the capability information of the printer and the print setting prohibition information (GetPrinterAttributeresponse) acquired from the engine control unit 314. The prohibition information is generated based on the configuration information of the printer, the print setting function supported by the information processing apparatus 103, and the prohibition capability. The configuration information includes information of detailed specifications to be displayed on an ordinary print setting screen, such as available paper sizes and paper types, single-sided/double-sided, and finishing settings such as stapling and punching. In this embodiment, a prohibition represents a combination of two or more settings that conflict with each other. Prohibition information is information indicating a combination of settings used to determine whether the settings conflict with each other, and is also referred to as a conflict rule or the like. Note that prohibition information may include, for example, information for resolving a confliction state when the settings are determined to conflict with each other. These pieces of prohibition information are appropriately used in a prohibition process on the client or a verification process on the printer (details thereof will be described later).

Based on the capability information received from the printing apparatus 101, the information processing apparatus 103 generates a print setting screen. A user sets print settings in the print setting screen generated based on the capability information, and presses a print button. The information processing apparatus 103 controls the print setting screen based on the capability information and the prohibition information notified from the printing apparatus 101 such that the limited setting items and combinations cannot be selected. For example, for a printer without a finisher, unavailable functions such as stapling and punching are grayed out, and an error is displayed to make it impossible to select the setting items that cannot be combined. When the print button in the print setting screen is operated, if the print settings do not match the prohibition conditions (first prohibition conditions) transmitted from the printing apparatus 101, a print setting verification request is transmitted to the printing apparatus 101.

More specifically, when the print button is pressed, the information processing apparatus 103 transmits a verification request (ValidateJob request) for the print settings created by the user to the printing apparatus 101. When the print setting verification request is received, the IPP print service control unit 315 passes the received print setting information to a job setting storage/verification unit 303. The job setting storage/verification unit 303 compares the job settings set by the information processing apparatus 103 with the print function and prohibition information of the printer and, if printing is available, notifies the information processing apparatus 103 of "Print OK" via the IPP print service control unit 315. On the other hand, if there are the print settings that cannot be combined in the printing apparatus 101, "NG" is notified to indicate that the print settings cannot be handled and a review of the print setting items is requested.

Only if the print settings do not match prohibition conditions (second prohibition conditions) held in the apparatus and the verification result of the print settings from the printing apparatus 101 is "OK", the information processing apparatus 103 transmits a print job including the print settings and print data to the printing apparatus 101. That is, according to this embodiment, if the print settings do not match the prohibition conditions (first prohibition conditions) received from the printing apparatus 101 and do not match other prohibition conditions (second prohibition conditions) held in the printing apparatus 101, printing based on the print settings is permitted.

If the print settings match the prohibition conditions in the information processing apparatus 103 or if a notification indicating that the print settings match the prohibition conditions is received from the printing apparatus 101, the information processing apparatus 103 prompts the user to change the print settings matching the prohibition conditions. If the user changes the print settings and presses the print button again, the information processing apparatus 103 transmits a print setting verification request to the printing apparatus 101 again. If a print job is received from the information processing apparatus 103, the IPP print service control unit 315 passes the print job to the print job generation unit 302, and passes the print job setting information to the job setting storage/verification unit 303.

Here, the job setting storage/verification unit 303, a prohibition condition list 320, a client identification unit 316, a prohibition level holding unit 304, a prohibition determination unit 321 included in the job control unit 307, and the prohibition condition DB 319 referred to by the respective modules will be described.

The prohibition condition DB 319 is a table storing all pieces of prohibition information held by the printing apparatus 101, and covers all connectable accessories, all settable paper information, and all print functions. With reference to FIGS. 11A-11E, the internal structure of the management table (prohibition condition DB) of the printing apparatus 101 of this embodiment will be described.

(Prohibition Condition DB 319)

In the management table shown in FIGS. 11A-11E, one prohibition condition is shown in one row. That is, the printing apparatus 101 holds 24 prohibition conditions, and they are uniquely identified by the management numbers in column A. Column B shows the number of prohibition items for each prohibition condition. Column C shows error contents each corresponding to a case in which a print job is canceled in accordance with the prohibition condition. The print functions of the printing apparatus 101 are arranged in functional units from columns D to AD, and represent combinations of the prohibition items. Columns D to F show the paper type settings for setting the paper types to be used for printing. Columns G to I show the paper size settings for selecting the paper sizes to be used for printing. Columns J to L show the paper feed position settings for selecting a paper sheet to be used for printing by the paper feed positions of the printing apparatus. Column M shows the double-sided printing setting for printing on both sides of a paper sheet. Columns N to U show the stapling settings for stapling printed paper sheets. Columns V to Y show the punching settings for punching holes on printed paper sheets. Columns Z to AB show the resolution settings for setting the print resolutions. Column AC shows the stamp print setting for printing watermark characters such as "confidential" or "copy prohibited" in the background of a paper sheet. Column AD shows the copy-forgery-inhibited pattern print setting for embedding, as the background, a character string that appears when an original is copied. For example, with regard to the prohibition condition of management number 1, the functions corresponding to the paper size "thick paper" and the double-sided printing setting are set to True and other functions are set to False. This indicates that the combination of "thick paper" and double-sided printing is the prohibition condition and cannot be processed by the printing apparatus 101.

The paper type settings in columns D to F, the paper size settings in columns G to I, the paper feed position settings in columns J to L, the double-sided printing setting in column M, the stapling settings in columns N to U, the punching settings in columns V to Y, and the resolution settings in columns Z to AB are definitions standardized in the IPP printing protocol. On the other hand, the stamp print setting in column AC and the copy-forgery-inhibited pattern print setting in column AD are the print functions specifically defined by the printer vendor. Therefore, when such a print function is set in the IPP protocol, the printer vendor-specific extended operations (vendor extensions) are defined and the printing apparatus 101 and the information processing apparatus 103 communicate with each other.

The job setting storage/verification unit 303 follows the request from the information processing apparatus 103, and verifies the print settings of a print job before and after the print job is submitted. A setting verification process immediately before the submission of a job is performed with reference to the prohibition condition DB 319. The prohibition condition list 320 manages the subset information of the prohibition information held in the prohibition condition DB 319. The subset information in the prohibition condition DB is prepared to reduce the data amount of the prohibition information to be transmitted from the printing apparatus 101 to the information processing apparatus 103. Examples of the prohibition condition list 320 are shown in FIGS. 12A to 14E.

(Prohibition Condition List 320)

FIGS. 12A-12E show the prohibition condition list 320 that includes the prohibition conditions from the prohibition conditions DB 319 but limited to those related to the main print settings. Here, an example is shown in which the paper type settings in columns D to E, the paper size settings in columns G to I, the paper feed position settings in columns J to L, the double-sided printing setting in column M, and the stapling settings in columns N to U are used as the main print settings. Note that the main print settings include settings that are frequently set when a print job is submitted. In order to omit the prohibition items corresponding to the punching settings in columns V to Y, the resolution settings in columns Z to AB, the stamp print setting in column AC, and the copy-forgery-inhibited pattern print setting in column AD, which are not the main print settings, the pieces of information related to the prohibition items of management numbers 10 to 13, 19, and 20 in column A are deleted.

FIGS. 13A-13E show the prohibition condition list 320 that includes the prohibition conditions from the prohibition condition DB 319 but limited to those with two prohibition items. The pieces of information related to the prohibition items of management numbers 21 to 24 in column A, in which the number of prohibition items is other than two, are deleted.

FIGS. 14A-14E show the prohibition condition list 320 that includes the prohibition conditions from the prohibition condition DB 319 but the vender-specific print settings are omitted. In this example, since the stamp print setting in column AC and the copy-forgery-inhibited pattern print setting in column AD correspond to the vender-specific print settings, the pieces of information related to the prohibition items of management numbers 19 and 20 in column A are deleted.

(Prohibition Level Setting Screen)

Among the prohibitions shown in FIGS. 12A to 14E, the prohibitions to be included in the prohibition condition list 320 when generating it are determined by the prohibition level holding unit 304 that holds values input on the prohibition level setting screen shown in FIG. 8. That is, the prohibition level according to this embodiment is information used to generate a prohibition condition list. FIG. 8 shows a screen 801 displayed in the operation unit 216 and used to set the level of the prohibition information to be transmitted to the information processing apparatus 103.

A check box 802 is a check box for setting the level of the prohibition information to be transmitted to the information processing apparatus 103 to "limit to the main print settings". If this check box is enabled by a user input, the printing apparatus 101 creates the table (prohibition condition list) described with reference to FIGS. 12A-12E as the prohibition condition list 320. Note that when a main print setting set button 803 is pressed, a setting screen 901 for the main print settings shown in FIG. 9 is displayed. In the setting screen 901, the setting items of the main print settings serving as the prohibition conditions can be individually selected. More specifically, each of the print setting items can be selected by selecting the corresponding check box of the main print settings. The main print settings include the print settings that are frequently set when a print job is submitted, and therefore in these print settings, a user is likely to input a setting that matches the prohibition condition.

A check box 804 is a check box for setting the level of the prohibition information to be transmitted to the information processing apparatus 103 to "limit to the condition with two prohibition items". If this check box is enabled, the printing apparatus 101 creates the table described with reference to FIGS. 13A-13E as the prohibition condition list 320. A check box 805 is a check box for setting the level of the prohibition information to be transmitted to the information processing apparatus 103 to "exclude the vender-specific settings". If this check box is enabled, the printing apparatus 101 creates the table described with reference to FIGS. 14A-14E as the prohibition condition list 320. Note that the check boxes 802, 804, and 805 can be combined and set.

Returning to the description of FIG. 3, the client identification unit 316 is a module in which the IPP print service control unit 315 determines the type of the information processing apparatus 103. The information processing apparatus is identified from user agent information (client information) 6101 in a printing apparatus capability request (GetPrinterAttributeRequest) issued by the information processing apparatus in step S402 to be described later.

The job control unit 307 collectively controls a print job received from the information processing apparatus 103. The prohibition determination unit 321 monitors the setting values stored in the job setting storage unit 308 and the page setting storage unit 311 during a print process (during print setting), and verifies whether each parameter satisfies the conditions in the prohibition condition DB 319. If the parameter does not satisfy the conditions in the prohibition condition DB 319, the print process is interrupted.

The UI control unit 301 acquires, from the job control unit 307, information on the status of a print job being processed, and displays the processing status of the print job on a UI screen.

The print job generation unit 302 receives a print job from the information processing apparatus 103 via the IPP print service control unit 315, writes drawing data in the data reception control unit 305, registers the print job in the job control unit 307 as a new job, and requests start of a print process. Furthermore, print setting information to be applied to the print job is passed to the job setting storage unit 308 via the job setting storage/verification unit 303.

The data reception control unit 305 is a buffer area for a print job received by the print job generation unit 302, and temporality stores each print job in the storage 214. If the job control unit 307 instructs the PDL analysis unit 306 to perform a PDL analysis process of a print job, the PDL analysis unit 306 requests the print job from the data reception control unit 305. Thus, the data reception control unit 305 passes the data of the print job to the PDL analysis unit 306.

The job control unit 307 instructs the PDL analysis unit 306 to analyze a print job. With regard to page data generated by the PDL analysis unit 306, the page control unit 309 stores the image data in the page storage unit 310, and stores the page setting information in the page setting storage unit 311. The job setting storage unit 308 stores the setting information of the print job. The setting information is set as IPP job settings such as "number of copies", "printing side (single-sided/double-sided) setting", "finishing setting", and document settings.

The page control unit 309 controls the page analysis process of the PDL analysis unit 306, the RIP process of the RIP control unit 313, and a print control process of the print control unit 312. The print control unit 312 acquires RIP-processed image data from the page storage unit 310, applies CMYK color separation to the acquired image data, and transfers the color-separated image data to the engine control unit 314. The engine control unit 314 receives the C, M, Y, and K image data of each page from the print control unit 312, and controls the printing unit 220 to perform a print process of each page.

<Printing Sequence>

Figure 4:
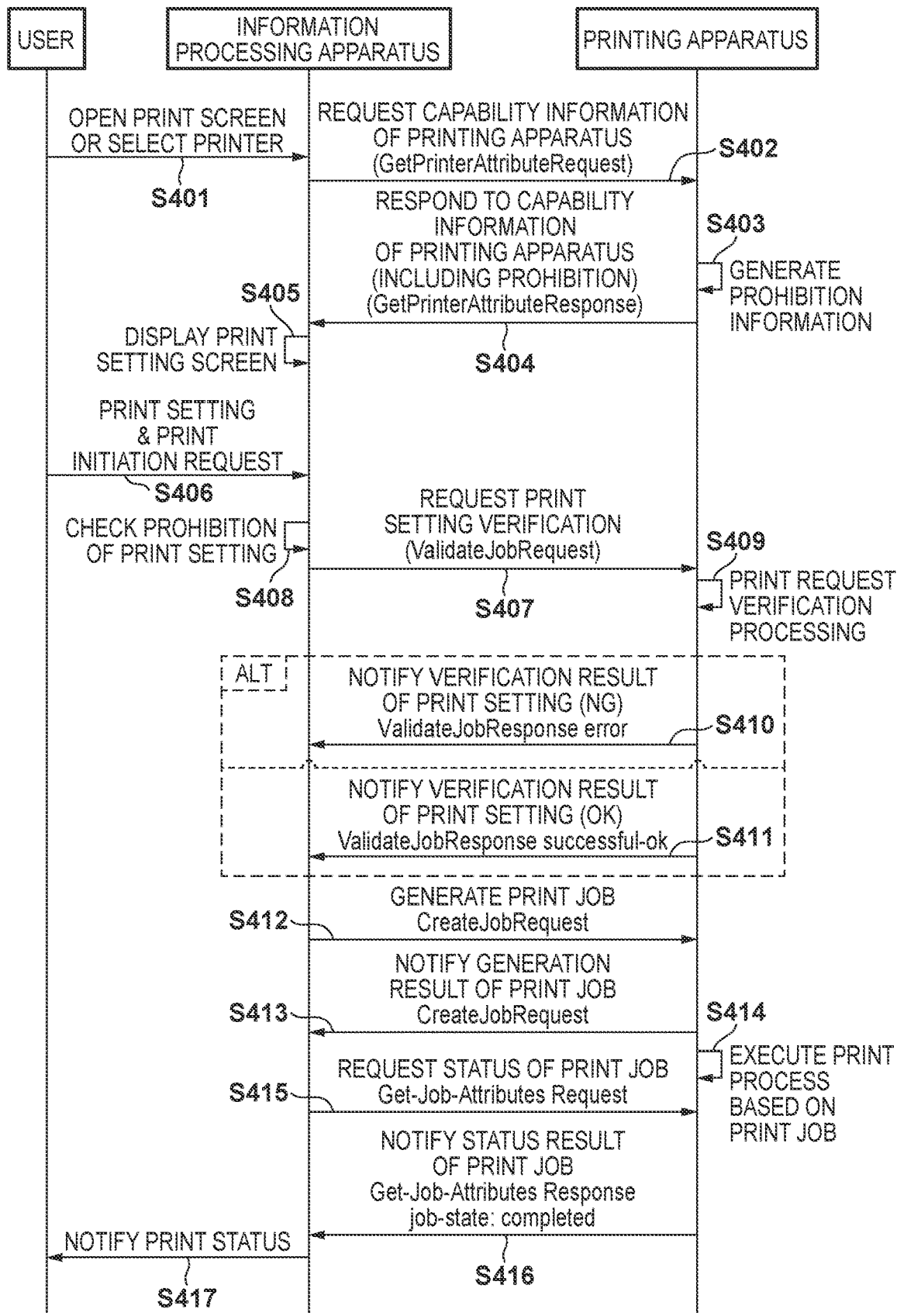
FIG. 4 is a sequence chart illustrating printing in the printing apparatus from an information processing apparatus.

Next, a printing sequence executed between the information processing apparatus 103 and the printing apparatus 101 in the printing system of this embodiment will be described with reference to FIG. 4. This printing sequence includes a basic sequence including a query for the capacity information of the printing apparatus 101, acquisition of the prohibition information, verification of the print settings, submission of a print job, and completion of printing.

In S401, the information processing apparatus 103 accepts a user operation performed by a user in which a print screen is opened from an application and a printer selection button is pressed. Then, in S402, the information processing apparatus 103 searches for the printing apparatus 101, and requests the capacity information of the printing apparatus 101 from a printer that has responded.

In S403, the printing apparatus 101 generates prohibition information to be notified to the information processing apparatus 103, and notifies the prohibition information together with the capacity information of the printing apparatus 101 in S404. In S405, the information processing apparatus 103 generates a print setting screen based on the information notified from the printing apparatus 101. Then in S406, the information processing apparatus 103 accepts the print settings input by a user operation via the print screen, and checks the prohibition conditions in S408 each time the print settings are updated. Further, if an operation of the print button on the print setting screen is accepted, the information processing apparatus 103 issues a print setting verification request to the printing apparatus 101 in S407. In S409, the printing apparatus 101 verifies the print settings with reference to the prohibition information held by it. If the printing settings match any prohibition condition, "NG" is returned in S410. The information processing apparatus 103 prompts the user to reset the print settings, and returns to S405.

If print data is received normally, the printing apparatus 101 notifies the information processing apparatus 103 of the completion of generation of a print job in S413. If the print job is received, the printing apparatus 101 performs a print process in S414. Then in S415, the information processing apparatus 103 issues a print job status request to the printing apparatus 101. In S416, if the print job is being printed, the printing apparatus 101 notifies of the status "printing", and if the print job is completed, the printing apparatus 101 notifies of the status "printing completed". In S417, the information processing apparatus 103 displays the notified status of the print job from the printing apparatus 101 on the screen to notify the user of the status, and terminates the printing sequence. On the other hand, if no printing setting matches the prohibition conditions in S409, "OK" is returned in S411. After that, the information processing apparatus 103 transmits a print job generation request in S412.

Note that as in this embodiment, when the prohibition conditions are checked each time the print settings are updated in S406, the information processing apparatus 103 can determine the print setting matching the prohibition condition, so notification of the information matching the prohibition condition in S410 is not required. However, the present invention is not limited to this, and it is conceivable to, for example, receive a plurality of pieces of print setting prohibition information at once and verify them. In this case, it is desirable to notify information indicating the print setting matching the prohibition condition in the response in S410.

<Print Setting Screen>

Next, examples of the print setting screen of the information processing apparatus 103 will be described with reference to FIG. 5. A UI screen 5100 is a print setting screen for a smartphone or a tablet, and a UI screen 5200 is an example of the print setting screen for a mobile PC. The information for these screens may be generated based on the information from the printing apparatus 101 in respective devices, or may be notified from the printing apparatus 101 as screen information.

In the UI screen 5100 (print setting screen) for a smartphone or a tablet, only a paper size setting 5101, a double-sided printing setting 5102, and a stapling setting 5103 can be set by user inputs. The paper size includes three patterns of A5/A4/A3, and as to the stapling position designation, only the top left can be set by a user input (UI notation is ON/OFF only).

On the other hand, in the UI screen 5200 (print setting screen) for a mobile PC, in addition to a double-sided printing setting 5201 and a paper size setting 5202, a paper type setting 5203, a stapling position setting 5204, and a punching position setting 5205 can be set by user inputs. Note that these setting items are merely examples, and it is not intended to limit the present invention. That is, the setting items may be changed in accordance with the specifications of the printing apparatus.

<IPP Communication Message>

Next, an example of IPP communication messages related to the capability information and the prohibition information exchanged between the information processing apparatus 103 and the printing apparatus 101 will be described with reference to FIG. 6.

A message 6100 is an example of the message querying the printing capability of the printing apparatus 101 by the information processing apparatus 103 in the above-described S402. The message 6100 is composed of HTTP layer header information and IPP message data on HTTP. Reference numeral 6101 denotes user agent (UserAgent) information set by the IPP client of the information processing apparatus 103. This value is used to determine the type of the client by the client identification unit 316 of the printing apparatus 101. Information 6102 indicates that the capacity information (copies-supported, document-format-supported) and prohibition information (job-constraints-supported) of the printing apparatus 101 are requested.

A message 6200 is an example of the message notified to the information processing apparatus 103 by the printing apparatus 101 in S404 as a response to the message 6100. Information 6201 is a response including the capability information of the printing apparatus 101 requested in the information 6102. Information 6202 is a response including the prohibition information requested in the information 6102. The information 6202 can include a plurality of pieces of prohibition information. Information 6203 is one of the pieces of prohibition information included in the information 6202, and shows an example in which double-sided printing on a thick paper sheet is prohibited. This is the prohibition condition of management number "1" shown in FIGS. 11A-11E. Other pieces of prohibition information can be described following the information 6203. In general, when the printing apparatus 101 replies the prohibition information, all of the prohibition items described in one of the prohibition condition lists shown in FIGS. 11 to 14 are described in the information 6202. Therefore, as the amount of the prohibition information to be notified increases, the information amount of the message 6200 increases accordingly.

Next, an example of IPP communication messages related to verification of the print settings exchanged between the information processing apparatus 103 and the printing apparatus 101 will be described with reference to FIG. 10.

A message 1000 is an example of the message requesting the printing apparatus 101 to verify the print settings by the information processing apparatus 103 in the above-described S407. The message 1000 is composed of HTTP layer header information and IPP message data on HTTP. Reference numeral 1001 denotes user agent information set by the IPP client of the information processing apparatus 103. This value is used to determine the type of the client by the client identification unit 316 of the printing apparatus 101. By comparing the value with the user agent information 6101 received in S402, it can be determined whether the determined client is same as the client to which the capability information and prohibition information have been transmitted. Information 1002 indicates the print settings of the print job. Here, "thick paper" and "single-sided printing" are set.

A message 1010 is an example of the message notified to the information processing apparatus 103 by the printing apparatus 101 in the above-described S413 as a response to the message 1000. The result of the verification of the print settings in the printing apparatus 101 is described in information 1011. Since the print settings in information 1002 do not match the prohibition conditions of the printing apparatus 101, they are determined to be printable, and "printable" (successful-ok) is replied in information 1011.

<Process Procedure of Printing Apparatus>

Figure 7:
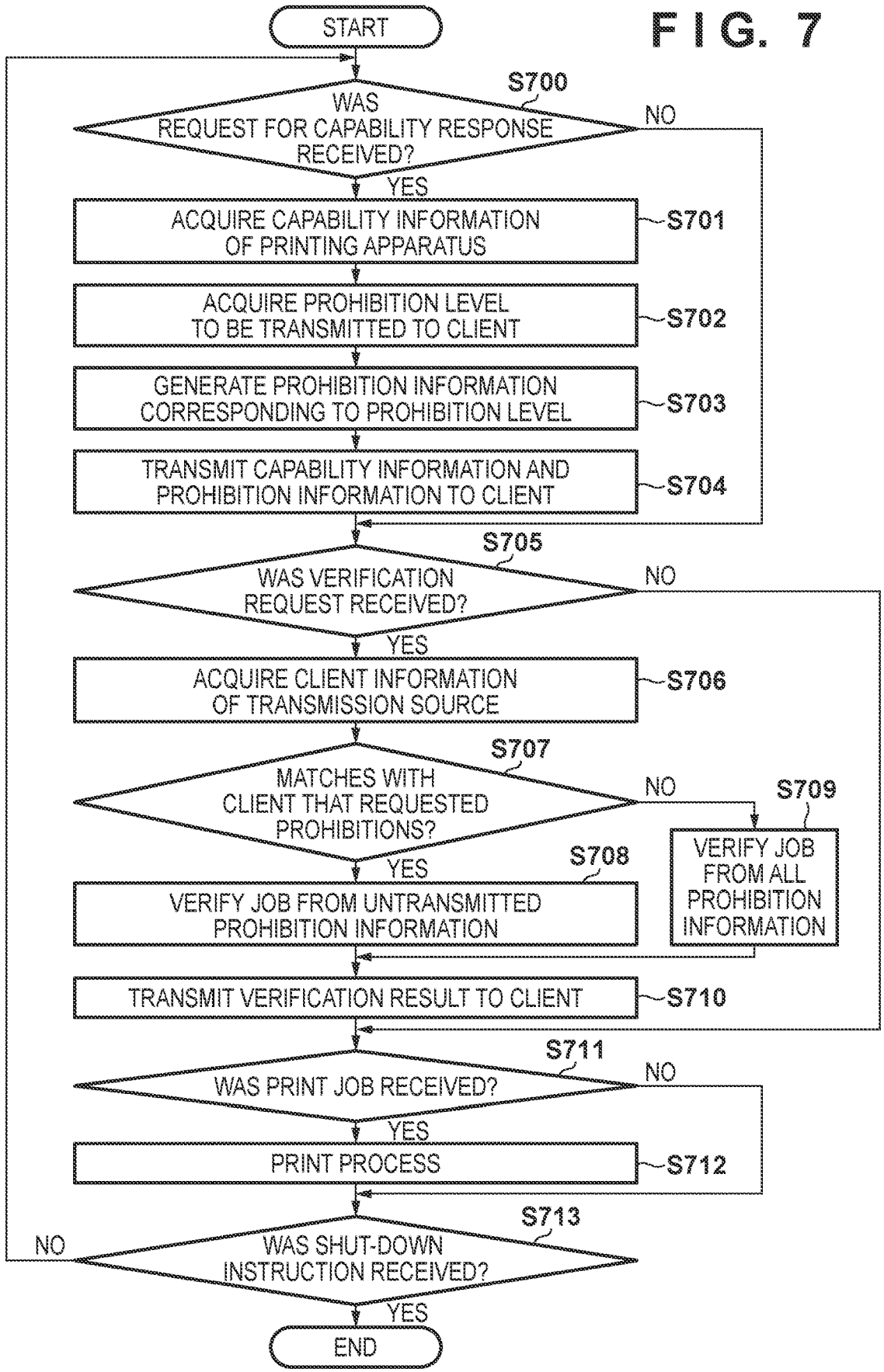
FIG. 7 is a flowchart illustrating a process of generating prohibition information by the printing apparatus.

Next, with reference to FIG. 7, the operation of the printing apparatus 101 in this printing system will be described in detail. The process to be described below is realized when, for example, the CPU 211 of the printing apparatus 101 reads out the programs from the ROM 212 or the storage 214 to the RAM 213 and executes them.

In step S700, the CPU 211 determines whether a request for the capability and prohibition of the printing apparatus 101 (S402) is received from the information processing apparatus 103. If the request is received, the process advances to step S701; otherwise, the process advances to step S705.

In step S701, the CPU 211 acquires the capability information of the printing apparatus 101 from the job control unit 307 and the engine control unit 314, and generates the capability information of the printing apparatus 101 to be transmitted to the information processing apparatus 103. Then, in step S702, the CPU 211 acquires, from the prohibition level holding unit 304, the level of the prohibition information to be transmitted to the information processing apparatus 103. In step S703, the CPU 211 generates the prohibition condition list 320 in accordance with the setting value acquired from the prohibition level holding unit 304. For example, if the value acquired from the prohibition level holding unit 304 indicates "limit to the main print settings" (802), the prohibition condition list shown in FIGS. 12A-12E is generated. If the value acquired from the prohibition level holding unit 304 indicates "limit to the condition with two prohibition items" (804), the prohibition condition list shown in FIGS. 13A-13E is generated. If the value acquired from the prohibition level holding unit 304 indicates "exclude the vender-specific settings" (805), the prohibition condition list shown in FIGS. 14A-14E is generated.

In step S704, the CPU 211 transmits the capability information generated in step S701 and the prohibition information generated in step S703 to the information processing apparatus 103. In step S705, the CPU 211 determines whether a print setting verification request (S407) is received from the information processing apparatus 103. If the request is received, the process advances to step S706; otherwise, the process advances to step S711.

In step S706, the CPU 211 acquires the user agent information 1001 attached to the print setting verification request message 1000, and advances to step S707. In step S707, the CPU 211 compares the user agent information 1001 in the print setting verification request message with the user agent information 6101 in the printing apparatus capability request to determine whether the information processing apparatus requesting the verification matches the information processing apparatus that has requested the prohibitions. If they match, the process advances to step S708; otherwise, the process advances to step S709.

In step S708, when verifying the print settings in the job setting storage/verification unit 303, the CPU 211 verifies the print settings using the prohibition conditions in the prohibition condition DB 319 while excluding the prohibition conditions included in the prohibition condition list 320 transmitted to the information processing apparatus 103, and advances to step S710. With this process, since the prohibition process performed in the information processing apparatus 103 is not repeated in the printer, speeding up of the print process can be expected. On the other hand, in step S709, when verifying the print settings in the job setting storage/verification unit 303, the CPU 211 verifies the print settings using the prohibition condition DB 319, and advances to step S710.

In step S710, the CPU 211 transmits the verification result to the information processing apparatus 103 (S410 or S411), and advances to step S711. In step S711, the CPU 211 determines whether a print job is received from the information processing apparatus 103. If the print job is received, the process advances to step S712; otherwise, the process advances to step S713. In step S712, the CPU 211 prints the print job received from the information processing apparatus 103, and advances to step S713. In step S713, the CPU 211 determines whether a shut-down instruction is received from the user via the operation unit 216. If the instruction is received, the process is terminated; otherwise, the process returns to step S701.

As described above, the printing apparatus according to this embodiment notifies, in accordance with a request from an information processing apparatus, the capability information of the printing apparatus and the first prohibition conditions including some of the rules each indicating a combination of the print settings that conflict with each other in the printing apparatus. In addition, the printing apparatus verifies whether the print settings, that are set via a setting screen displayed in the information processing apparatus in accordance with the notified information, match the second prohibition conditions including the other rules each indicating a combination of the print settings that conflict with each other in the printing apparatus. Furthermore, if the set print settings do not match the second prohibition conditions, the printing apparatus permits the printing based on the print settings set via the setting screen, and if the set print settings match the second prohibition condition, the printing apparatus limits the printing based on the print settings set via the setting screen. With this process, the printing apparatus according to this embodiment can reduce the data amount of the prohibition information to be transmitted to the information processing apparatus, and can appropriately suppress the print settings that match the prohibition condition. When limited to the main settings, it is possible to expect a reduction of more than half of the general prohibition information, although depending on the number of functions of the printer. Also, even when the prohibition information is reduced, since the prohibitions on the print settings (such as paper size, double-sided printing, and stapling setting) that are frequently set by a user are not omitted, the necessary prohibition information can be presented on the client side. Thus, it is possible to balance the client load reduction with the prohibition process for the user.

According to the present invention, even when a mobile terminal or the like performs printing via a general print service such as IPP, a printing apparatus can reduce the data amount of the prohibition information to be transmitted to the client. In addition, it is possible to present the necessary prohibition information in the range of the main print settings that are assumed to be operated by a user. Thus, it is possible to balance the client load reduction with the prohibition process for the user.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-189445 filed on Oct. 4, 2018, which is hereby incorporated by reference herein in its entirety.

What is claimed is:

1. A printing apparatus comprising:
    a memory device that stores a plurality of combinations of print settings that conflict with each other; and
    at least one processor that executes a set of instructions to:
        notify an information processing apparatus of first combinations included in the stored plurality of combinations and not notify the information processing apparatus of second combinations which are different from the first combinations and which are included in the plurality of combinations stored in the memory device,
        receive print settings set in the information processing apparatus while avoiding the first combinations,
        verify whether the received print settings do not include settings that conflict with each other, based on the second combinations, wherein the at least one processor does not use at least one of the first combinations included in the stored plurality of combinations when verifying whether the received print settings do not include settings that conflict with each other, and
        notify the information processing apparatus of a result of the verification.

2. The printing apparatus according to claim 1, wherein the at least one processor executes the set of instructions to:
    display a setting screen for setting the first combinations of the print settings that conflict with each other, and
    set the first combinations of the print settings that conflict with each other, in accordance with a user input via the displayed setting screen.

3. The printing apparatus according to claim 2, wherein a prohibition condition including the print settings that are likely to be input by a user, a prohibition condition for limiting the number of items of the print settings serving as the prohibition condition, or a prohibition condition specific to a vender of the printing apparatus can be set as the first combinations of the print settings that conflict with each other.

4. The printing apparatus according to claim 3, wherein for the prohibition condition including the print settings that are likely to be input by a user, setting items serving as the prohibition condition can be individually selected.

5. The printing apparatus according to claim 1, wherein the at least one processor executes the set of instructions to:
    verify, each time the print settings set in the information processing apparatus are updated, whether the updated print settings include print settings that conflict with each other based on the second combinations.

6. The printing apparatus according to claim 1, wherein a print setting screen displayed in the information processing apparatus is a screen where print settings are limited based on the received first combinations.

7. The printing apparatus according to claim 1, wherein the printing apparatus and the information processing apparatus communicate with each other using IPP (Internet Printing Protocol) communication.

8. A control method for a printing apparatus comprising a memory device that stores a plurality of combinations of print settings that conflict with each other, the method comprising:
    notifying an information processing apparatus of first combinations included in the stored plurality of combinations and not notify the information processing apparatus of second combinations which are different from the first combinations and which are included in the stored plurality of combinations,
    receiving print settings set in the information processing apparatus while avoiding the first combinations,
    verifying whether the received print settings do not include settings that conflict with each other, based on the second combinations, wherein the at least one processors does not use at least one of the first combinations included in the stored plurality of combinations when verifying whether the received print settings do not include settings that conflict with each other, and
    notifying the information processing apparatus of a result of the verification.

9. A non-transitory computer-readable storage medium storing a computer program for causing a computer to execute respective steps in a control method for a printing apparatus comprising a memory device that stores a plurality of combinations of print settings that conflict with each other, the method comprising:
    notifying an information processing apparatus of first combinations included in the stored plurality of combinations and not notify the information processing apparatus of second combinations which are different from the first combinations and which are included in the stored plurality of combinations,
    receiving print settings set in the information processing apparatus while avoiding the first combinations,
    verifying whether the received print settings do not include settings that conflict with each other, based on the second combinations, wherein the at least one processors does not use at least one of the first combinations included in the stored plurality of combinations when verifying whether the received print settings do not include settings that conflict with each other, and
    notifying the information processing apparatus of a result of the verification.

10. The printing apparatus according to claim 1, wherein the at least one processor executes the set of instructions to:
    notify the information processing apparatus of success of the verification in a case where the received print settings do not include settings corresponding to the second combinations.

11. The printing apparatus according to claim 1, wherein the at least one processor executes the set of instructions to:
    notify the information processing apparatus of failure of the verification in a case where the received print settings include settings to the second combinations.

12. The printing apparatus according to claim 1, wherein the at least one processor executes the set of instructions to:

determine whether or not a transmission source of the received print settings is the same as a notification destination of the first combinations, and verify whether the received print settings do not include settings that conflict with each other based on both of the first combinations and the second combinations in a case where the transmission destination is different from the notification destination.

13. The printing apparatus according to claim 1, wherein the at least one processor executes the set of instructions to:

receive a request of the verification with print settings from the information processing apparatus, and verify, in response to the received request, whether the received print settings do not include settings that conflict with each other, based on the second combinations, wherein the at least one processors does not verify whether the received print settings include settings that conflict with each other, based on at least one of the first combinations included in the stored plurality of combinations.

14. The printing apparatus according to claim 1, wherein the at least one processor executes the set of instructions to:

receive print data from the information processing apparatus which has received the result of the verification, which indicates success of the verification.

* * * * *